US012567400B1

(12) United States Patent (10) Patent No.: US 12,567,400 B1

Yoo et al. (45) Date of Patent: Mar. 3, 2026

(54) ANNOTATED SYNTHESIZED SPEECH DATA

(71) Applicant: Amazon Technologies, Inc., Seattle, WA (US)

(72) Inventors: Kayeon Yoo, London (GB); Yang Li, Bishop's Stortford (GB); Aanusha Ghosh, Cambridge (GB); Ewa Magdalena Muszynska, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 18/075,968

(22) Filed: Dec. 6, 2022

(51) Int. Cl.
| | |
|---|---|
| *G10L 13/047* | (2013.01) |
| *G06F 3/0482* | (2013.01) |
| *G06F 3/0484* | (2022.01) |
| *G06F 3/16* | (2006.01) |
| *G06F 40/30* | (2020.01) |

(52) U.S. Cl.
CPC .......... *G10L 13/047* (2013.01); *G06F 3/0482* (2013.01); *G06F 3/0484* (2013.01); *G06F 3/165* (2013.01); *G06F 40/30* (2020.01)

(58) Field of Classification Search
CPC ... G10L 13/047; G06F 3/0482; G06F 3/0484; G06F 3/165; G06F 40/30
See application file for complete search history.

(56) References Cited

U.S. PATENT DOCUMENTS

| | | | | |
|---|---|---|---|---|
| 9,978,359 | B1* | 5/2018 | Kaszczuk | ............... G10L 13/02 |
| 10,699,695 | B1* | 6/2020 | Nadolski | ............... G10L 13/047 |
| 2008/0167875 | A1* | 7/2008 | Bakis | .................... G10L 13/033 |
| | | | | 704/260 |
| 2014/0122081 | A1* | 5/2014 | Kaszczuk | ............... G10L 13/08 |
| | | | | 704/260 |
| 2016/0240215 | A1* | 8/2016 | Suess | ....................... G10L 13/04 |
| 2020/0058290 | A1* | 2/2020 | Chae | ....................... G10L 15/16 |
| 2021/0217403 | A1* | 7/2021 | Chae | ....................... G10L 25/60 |

* cited by examiner

*Primary Examiner* — Bhavesh M Mehta
*Assistant Examiner* — Nandini Subramani
(74) *Attorney, Agent, or Firm* — Pierce Atwood LLP

(57) ABSTRACT

Techniques for evaluating speech synthesis components are described. A system presents speech synthesis audio along with the underlying content (such as text) and allows a user to indicate where an error (such as a pause error) appears in the synthesized speech, along with a category and severity of the error. The system may perform operations to make corrections based on the user inputs. The system may also generate training data and/or a test set of similar annotated data, which may be used to train/retrain and/or evaluate speech synthesis model(s) in an automated fashion.

17 Claims, 15 Drawing Sheets

FIG. 1

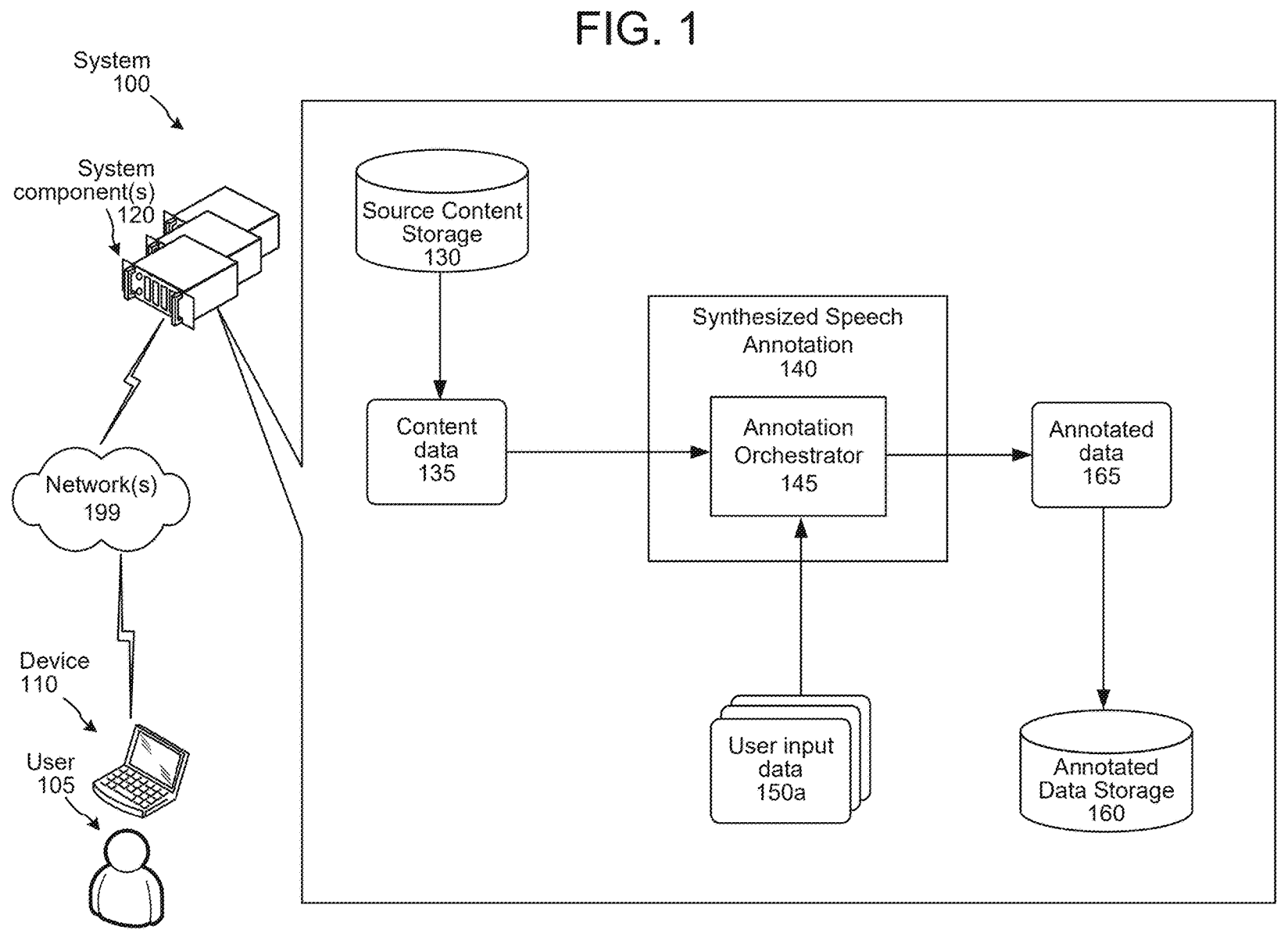

System 100

System component(s) 120

Source Content Storage 130

Content data 135

Synthesized Speech Annotation 140

Annotation Orchestrator 145

User input data 150a

Annotated data 165

Annotated Data Storage 160

Network(s) 199

Device 110

User 105

FIG. 2

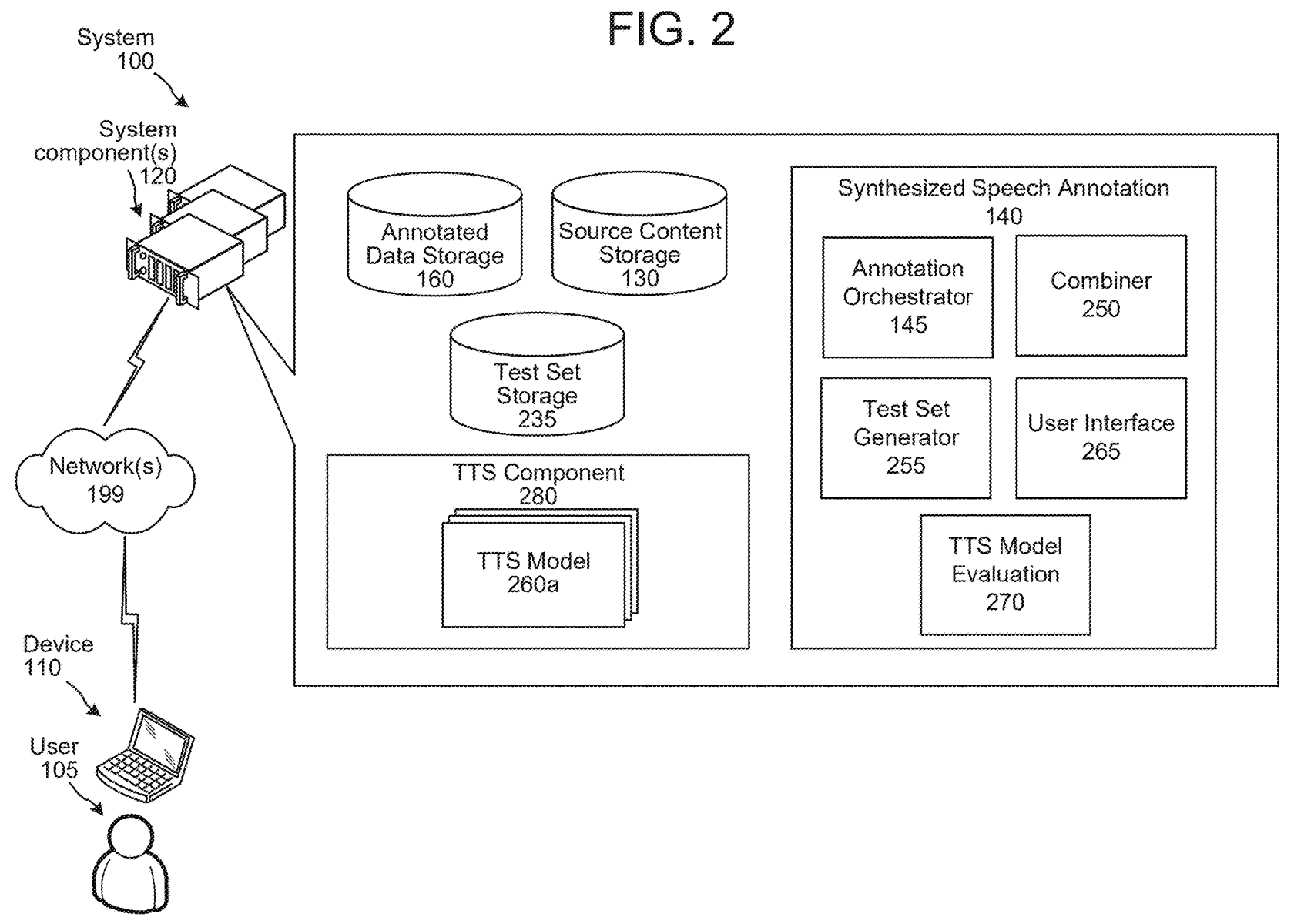

System 100

System component(s) 120

Synthesized Speech Annotation 140

Annotation Orchestrator 145

Combiner 250

Test Set Generator 255

User Interface 265

TTS Model Evaluation 270

Source Content Storage 130

Annotated Data Storage 160

Test Set Storage 235

TTS Component 280

TTS Model 260a

Network(s) 199

Device 110

User 105

Content data 135

Other input data 325

TTS Component 280

Preprocessing 320

TTS Model 160a-n

Voice Profile Storage 385

Spectrogram data 345

Other output data 355

Vocoder 390

Synthesized speech audio data 395

Figure 10:
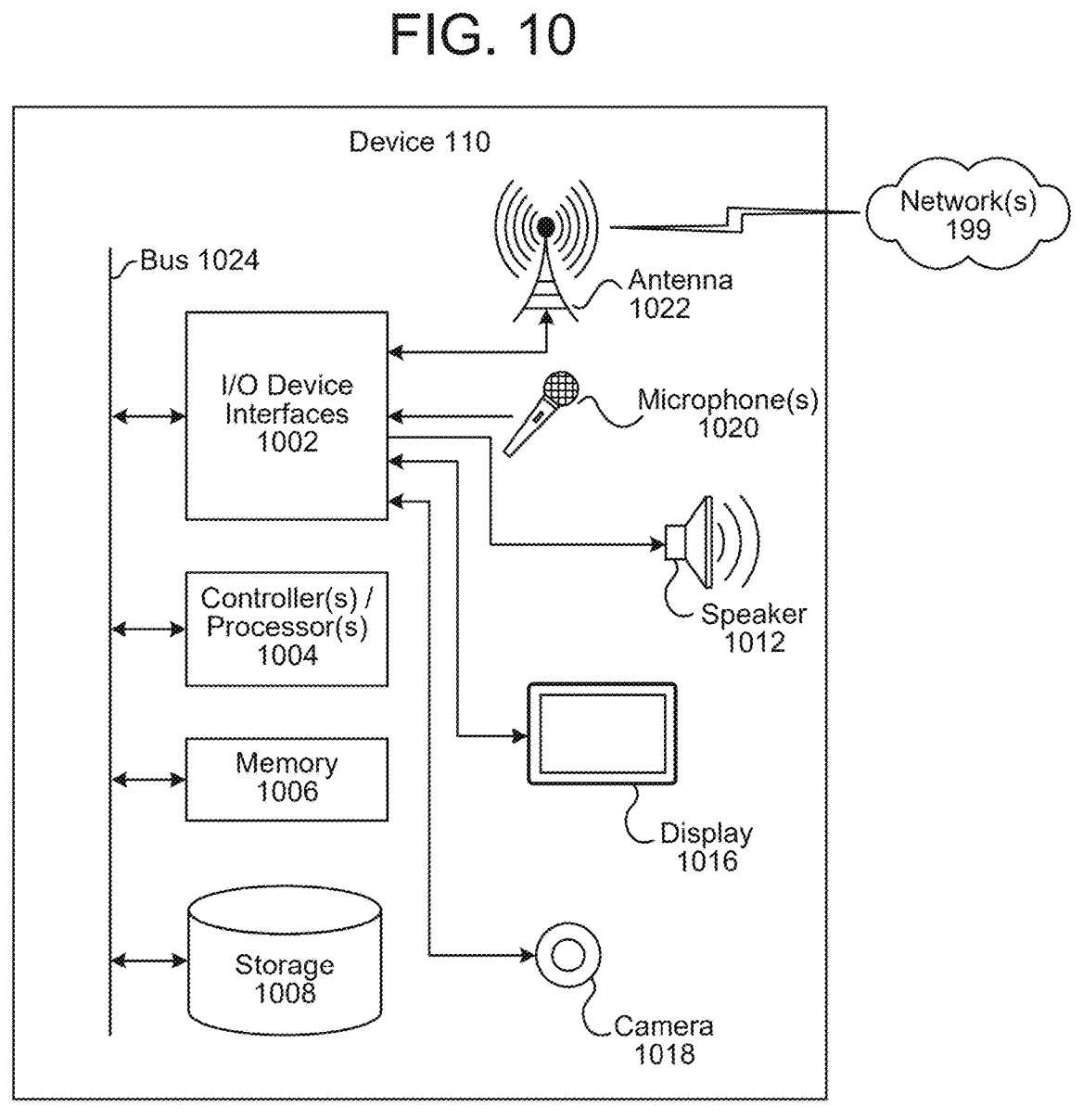

Network(s)
199

Device 110

Antenna
1022

Microphone(s)
1020

Speaker
1012

Display
1016

Camera
1018

Bus 1024

I/O Device
Interfaces
1002

Controller(s) /
Processor(s)
1004

Memory
1006

Storage
1008

FIG. 11

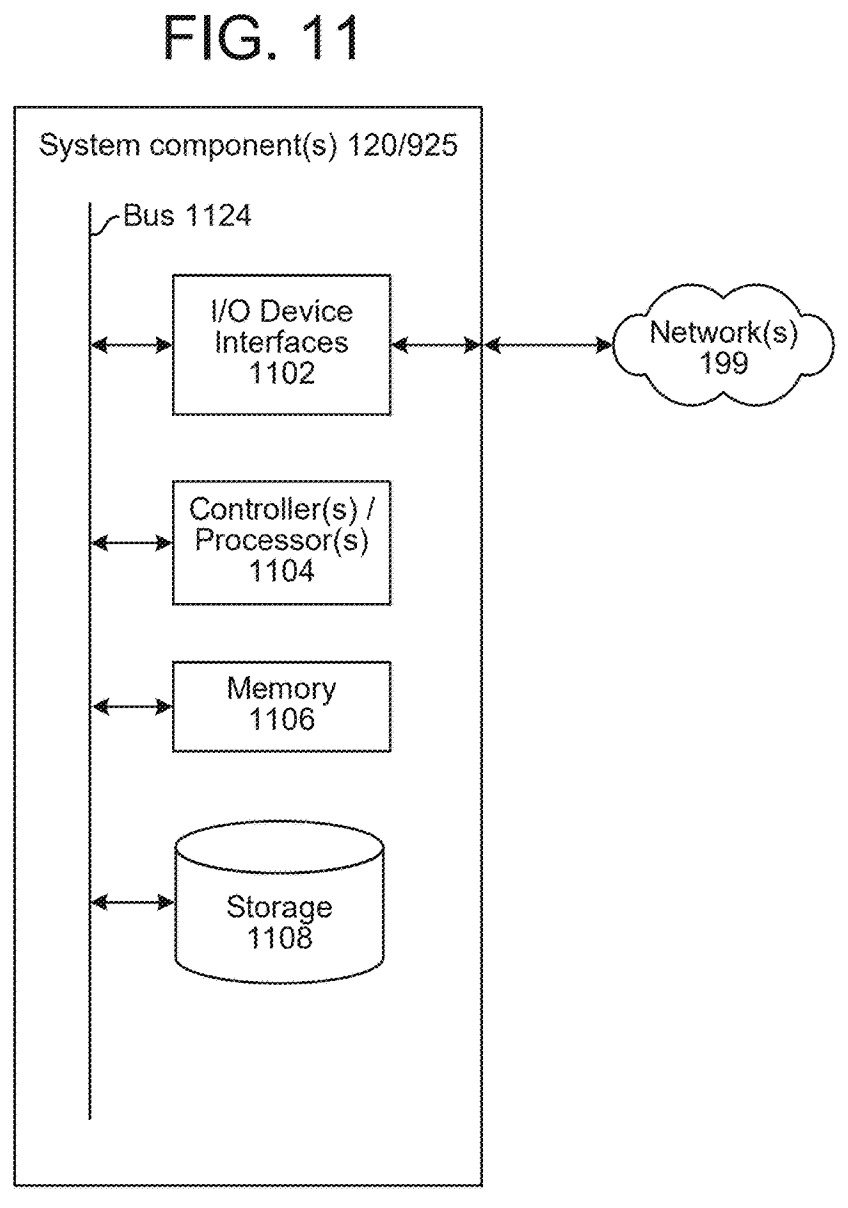

System component(s) 120/925

Bus 1124

Network(s) 199

I/O Device Interfaces 1102

Controller(s) / Processor(s) 1104

Memory 1106

Storage 1108

ANNOTATED SYNTHESIZED SPEECH DATA

BACKGROUND

A speech-processing system includes a speech-synthesis component for processing input data such as text and/or audio data to determine output data that includes a representation of speech. The speech corresponds to one or more characteristics, such as tone, pitch, or frequency. The speech-synthesis component processes different characteristics to produce different speech.

BRIEF DESCRIPTION OF DRAWINGS

For a more complete understanding of the present disclosure, reference is now made to the following description taken in conjunction with the accompanying drawings.

FIG. 1 is a conceptual diagram illustrating example processing that may be performed by an annotation orchestrator component of a synthesized speech annotation component, according to embodiments of the present disclosure.

FIG. 2 is a conceptual diagram illustrating example components of a system for generating annotated synthesized speech data, according to embodiments of the present disclosure.

FIG. 6 is a conceptual diagram illustrating example processing that may be performed to process annotated synthesized speech data, according to embodiments of the present disclosure.

FIG. 10 is a block diagram conceptually illustrating example components of a device, according to embodiments of the present disclosure.

FIG. 11 is a block diagram conceptually illustrating example components of a system, according to embodiments of the present disclosure.

DETAILED DESCRIPTION

Figure 3:
FIG. 3 is a conceptual diagram of text-to-speech components according to embodiments of the present disclosure.

Speech-processing systems may include one or more speech-synthesis components that employ one or more of various techniques to generate synthesized speech from input data (such as audio data, text data, and/or other data) representing first speech. The speech-synthesis component may include a neural-network encoder for processing the input data and determining encoded data representing the speech and a neural-network decoder for processing the encoded data to determine output data representing the speech. The encoder may process further encoded data representing characteristics of speech; the output data may correspond to these characteristics.

Use of machine learning techniques, such as neural networks and the like, may assist in creating more lifelike synthesized speech. Testing and evaluating of machine learning models used for speech synthesis, may assist in ultimately selecting and revising such models to improve synthesized speech output and create a more desirable user experience. Speech synthesis models may be evaluated for various overall qualities of a synthesized voice such as speech, pitch, prosody, emotion, etc. Speech synthesis models may also be evaluated for particular performance regarding localized sections of synthesized speech.

For example, a system may utilize a speech synthesis model (e.g., a text-to-speech (TTS) model) to predict phrasing when generating synthesized speech. As used herein, "phrasing" refers to a speech phenomenon where utterances are broken down into smaller groups of words and/or other combinations of sounds with pauses and other intonational and durational cues at phrase boundaries. For example, the speech synthesis model may make a prediction as to where a non-sound pause and/or cue is located in the synthesized speech, and how long the pause should persist. Some systems may employ techniques such as relying on commas in the content being synthesized and other hard-coded rules to insert fixed-duration pauses in synthesized speech. These techniques may be improved by the system being configured to take into consideration a context or syntactical structure of the text data being used to generate the synthesized speech. This, among other things described herein, can help improve the user experience.

As used herein "syntactical structure" may be defined as the format in which words, phrases, punctuation, and/or clauses are arranged to create a sentence (e.g., text data). For example, the syntactical structure of a sentence "Bob jumped happily" is different from the syntactical structure of a sentence "Happily, Bob jumped." Based on the syntactical structure of a sentence, a TTS model may predict pauses in the aforementioned sentences differently when generating corresponding output audio data, even though the semantic meaning of the content is similar.

Offered is, among other things, a system to obtain user feedback on output speech synthesis, with a particular focus on obtaining data indicating a category/type of an error (e.g., pause too short, pause too long, etc.), a severity level of the error (e.g., low, medium, and high), as well as a location of the error with respect to the audio of the synthesized speech and/or the underlying text of the speech. The present system may gather annotated data related to errors (e.g., pauses) and may evaluate individual speech synthesis models using the annotated data as well as use the annotated data to create training and/or test data that may be used to make efficient evaluations of other speech synthesis models that may not necessarily be explicitly tested by a human user. Although the techniques for obtaining feedback and processing resulting annotated data described herein may focus on speech synthesis evaluation with respect to pauses, the present teachings may be applied for other TTS errors which may be evaluated and adjusted according to the techniques described herein.

For example, a system of the present disclosure may receive content data (e.g., text data), generate, using a TTS model, output audio data corresponding to the content data (e.g., a synthesized voice "speaking" the words represented in the content data), and cause a graphical user interface (GUI) to present the output audio data and underlying text data to a user. The system may receive one or more user inputs representing annotations corresponding to the output audio data, where the annotations may represent an identification of an error in the output audio data/synthesized speech (e.g., a selection of a portion of the content data where the error in the output audio data is located, a category corresponding to the error, and a severity level corresponding to the error). The system may determine user input data corresponding to the one or more user inputs of the annotations, and determine annotated data representing those annotations corresponding to the user input data. The system may then perform various operations using the annotated data, such as storing the annotated data, and causing the GUI to present data corresponding to the annotated data to the user. As used herein "content data" may correspond to a tokenized or other textual representation of speech and/or any other information associated with the tokenized or textual representation of speech (e.g., punctuation, pronunciation, volume, pitch, rate, and or any other metadata (e.g., Speech Synthesis Markup Language (SSML)).

The system of the present disclosure may also use the annotated data to determine training and/or test set data including the annotated data and one or more instances of previous annotated data determined to be syntactically and/or semantically similar to the annotated data. The system may store the training and/or test set data in storage. Such test set data may be used to evaluate output audio data generated using different TTS model(s), to see if such output audio data makes similar errors that led to the annotations. This evaluation may be performed without necessarily running such output audio data of the different TTS model(s) through a process involving human annotation. The training data may be used to train/re-train different TTS model(s).

The system of the present disclosure may thus determine, among other things, content data (e.g., text data) included in the annotated data of the test set data and may use the content data to determine one or more performance scores for one or more TTS models, using output audio data generated using the one or more TTS models using the content data, based on whether the output audio data generated using the one or more TTS models includes the pauses identified by the user in the corresponding annotated data. The system may use the performance scores to evaluate the performance of one or more TTS model(s) with respect to the potential error(s) represented in the annotated data. The system may also use the scores to select one TTS model over another TTS model for use in performing additional processing (e.g., further correction/training, selection for use in performing a speech synthesis task, etc.). The system may thus use the performance scores to cause targeted training of one or more of the one or more TTS models based on the test set data. Additionally, or alternatively, the system may thus use the training data to cause targeted training of one or more of the one or more TTS models, with or without using the test set data to evaluate the TTS model(s).

Teachings of the present disclosure provide an improved framework for evaluating phrase prediction accuracy of TTS models using user-provided annotations to synthesized speech. Teachings of the present disclosure further allow the system to automatically determine training and/or test sets of syntactically and/or semantically similar annotated data, which may be used to evaluate one or more TTS models to select a top-performing TTS model and/or provide directed training to one or more of the one or more of the TTS models.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for generating annotated synthesized speech data. For example, the system 100 may generate such data based on user inputs received from one or more user(s) 105. The system 100 may include a device 110, local to the user 105, in communication with one or more system component(s) 120 via a network(s) 199. The network(s) 199 may include the internet and/or any other wide- or local-area network, and may include wired, wireless, and/or cellular network hardware.

The system component(s) 120 may include various components. With reference to FIG. 1, the system component(s) 120 may include a source content storage 130, a synthesized speech annotation component 140, and an annotated data storage 160. As illustrated in FIG. 1, the synthesized speech annotation component 140 may include an annotation orchestrator component 145.

FIG. 1 further illustrates the annotation orchestrator component 145 of the synthesized speech annotation component 140 generating annotated data 165. With reference to FIG. 1, the annotation orchestrator component 145 may receive content data 135 (e.g., a textual and/or tokenized representation of speech) from a source content storage 130 and one or more instances of user input data 150a-n, and may process the content data 135 and the one or more instances of user input data 150a-n to determine annotated data 165. The annotated data 165 may represent user corrections and/or indications of errors (e.g., error type, error severity, error location, etc.) that are received as part of the operations and user interface interactions described herein, for example with regard to FIGS. 4A-5B. Alternatively, or in addition, in some embodiments, the annotated data 165 may further represent a model identifier corresponding to a TTS model 260a-n used in generation of the output audio data corresponding to the annotated data 165 and/or data indicating the configuration of one or more setting(s) of the TTS model 260a-n used in generation of output audio data corresponding to the annotated data 165. Alternatively, or in addition, in some embodiments, the annotated data 165 may represent a user identifier corresponding to the user 105 interacting with the system 100 to provide the annotations. Alternatively, or in addition, in some embodiments, the annotated data 165 may represent an identifier corresponding to the content data 135, an error category/type, an error severity, and an error location in the content data 135 and/or the output audio data generated using the content data 135. The annotation orchestrator component 145 may send the annotated data 165 to the annotated data storage 160. In some embodiments, the annotation orchestrator component 145 may cause the annotated data 165 to be output to a user 105. Processing to test one or more TTS model(s) 260a-n, and to generate the annotated data 165 is described herein below with respect to FIGS. 4A-4C.

FIG. 2 illustrates further components of the system 100 for generating annotated synthesized speech data. For example, with reference to FIG. 2, the system component(s) 120 may further include a test set storage 235, and the synthesized speech annotation component 140 may further include a combiner component 250, a test set generator component 255, a user interface component 265, and a TTS model evaluation component 270. The system component(s) 120 may also include a TTS component 280 that may use one or more TTS model(s) 260*a*-*n* to actually generate synthesized speech. Actual generation of synthesized speech using the TTS component 280 is described in detail below with regard to FIGS. 4A-4C. The synthesized speech annotation component 140 may include an annotation orchestrator component 145, a combiner component 250, a test set generator component 255, a user interface component 265, and a TTS model evaluation component 270. Further discussion of operation of these components will follow the discussion of operation of the TTS component 280.

Components of a system that may be used to perform unit selection, parametric TTS processing, and/or model-based audio synthesis are shown in FIG. 3. FIG. 3 is a conceptual diagram that illustrates operations for generating synthesized speech using a TTS component 280, according to embodiments of the present disclosure. The TTS component 280 may receive content data 135 (e.g., a textual and/or tokenized representation of speech) and process it using one or more TTS model(s) 260*a*-*n* to generate synthesized speech in the form of spectrogram data 345. A vocoder 390 may convert the spectrogram data 345 into output speech audio data 395, which may represent a time-domain waveform suitable for amplification and output as audio (e.g., from a loudspeaker).

The TTS component 280 may additionally receive other input data 325. The other input data 325 may include, for example, identifiers and/or labels corresponding to a desired speaker identity, voice characteristics, emotion, speech style, etc. desired for the synthesized speech. In some implementations, the other input data 325 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the content data 135 and/or the other input data 325 such as metadata accompanying a TTS request and indicating what text should be whispered (or have some other indicated audio characteristic).

The TTS component 280 may include a preprocessing component 320 that can convert the content data 135 and/or other input data 325 into a form suitable for processing by the TTS model(s) 260*a*-*n*. The content data 135 may be from, for example an application, a skill component (described further below), an NLG component, another device or source, or may be input by a user. The content data 135 received by the TTS component 280 may not necessarily be text, but may include other data (such as symbols, code, other data, etc.) that may reference text (such as an indicator of a word and/or phoneme) that is to be synthesized. The preprocessing component 320 may transform the content data 135 into, for example, a symbolic linguistic representation, which may include linguistic context features such as phoneme data, punctuation data, syllable-level features, word-level features, and/or emotion, speaker, accent, or other features for processing by the TTS component 280. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the content data 135, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 320 may include functionality and/or components for performing text normalization, linguistic analysis, linguistic prosody generation, or other such operations. During text normalization, the preprocessing component 320 may first process the content data 135 and generate standard text, converting such things as numbers, abbreviations (such as Apt., St., etc.), symbols ($, %, etc.) into the equivalent of written out words.

During linguistic analysis, the preprocessing component 320 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model(s) 260*a*-*n* may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 320 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

The output of the preprocessing component 320 may be a symbolic linguistic representation, which may include a sequence of phonetic units. In some implementations, the sequence of phonetic units may be annotated with prosodic characteristics. In some implementations, prosody may be applied in part or wholly by a TTS model 260*a*-*n*. This symbolic linguistic representation may be sent to the TTS model 260*a*-*n* for conversion into audio data (e.g., in the form of Mel-spectrograms or other frequency text data format).

The TTS component 280 may retrieve one or more previously trained and/or configured TTS models 260*a*-*n* from the voice profile storage 385. A TTS model 260*a*-*n* may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 260a-n may be stored in the voice profile storage 385. A TTS model 260a-n may represent a particular speaker identity and may be conditioned based on speaking style, emotion, etc. In some implementations, a particular speaker identity may be associated with more than one TTS model 260a-n; for example, with a different model representing a different speaking style, language, emotion, etc. in some implementations, a particular TTS model 260a-n may be associated with more than one speaker identity; that is, be able to produce synthesized speech that reproduces voice characteristics of more than one character. Thus a first TTS model 260a may be used to create synthesized speech for the first system component 120a while a second, different, TTS model 260b may be used to create synthesized speech for the second system component 120b. In some cases, the TTS model 260a-n may generate the desired voice characteristics based on conditioning data received or determined from the content data 135 and/or the other input data 325. For example a synthesized voice of the first system component 120a may be different from a synthesized voice of the second system component 120b.

The TTS component 280 may, based on an indication received with the content data 135 and/or other input data 325, retrieve a TTS model 260a-n from the voice profile storage 385 and use it to process input to generate synthesized speech. The TTS component 280 may provide the TTS model 260a-n with any relevant conditioning labels to generate synthesized speech having the desired voice characteristics. The TTS model 260a-n may generate spectrogram data 345 (e.g., frequency text data) representing the synthesized speech, and send it to the vocoder 390 for conversion into an audio signal.

The TTS component 280 may generate other output data 355. The other output data 355 may include, for example, indications or instructions for handling and/or outputting the synthesized speech. For example, the content data 135 and/or other input data 325 may be received along with metadata, such as SSML tags, indicating that a selected portion of the content data 135 should be louder or quieter. Thus, the other output data 355 may include a volume tag that instructs the vocoder 390 to increase or decrease an amplitude of the output speech audio data 395 at times corresponding to the selected portion of the content data 135. Additionally or alternatively, a volume tag may instruct a playback device to raise or lower a volume of the synthesized speech from the device's current volume level, or lower a volume of other media being output by the device (e.g., to deliver an urgent message).

The vocoder 390 may convert the spectrogram data 345 generated by the TTS model 260a-n into an audio signal (e.g., an analog or digital time-domain waveform) suitable for amplification and output as audio. The vocoder 390 may be, for example, a universal neural vocoder based on Parallel WaveNet or related model. The vocoder 390 may take as input audio data in the form of, for example, a Mel-spectrogram with 80 coefficients and frequencies ranging from 50 Hz to 12 kHz. The synthesized speech audio data 395 may be a time-domain audio format (e.g., pulse-code modulation (PCM), waveform audio format (WAV), µ-law, etc.) that may be readily converted to an analog signal for amplification and output by a loudspeaker. The synthesized speech audio data 395 may consist of, for example, 8-, 16-, or 24-bit audio having a sample rate of 16 kHz, 24 kHz, 44.1 kHz, etc. In some implementations, other bit and/or sample rates may be used.

With reference once more to FIG. 2, the system 100 may be configured to receive one or more user inputs, from the user 105, representing annotations corresponding to performance of a particular TTS model used by the TTS component 280 to generate output audio data, and may generate, using the annotation orchestrator component 145, the one or more user inputs, and content data (e.g., used to generate the output audio data, annotated data corresponding to the annotations. The system 100 may also use the test set generator component 255 to automatically determine test set data including the annotated data and similar annotated data that was previously generated, which may be used by the TTS model evaluation component 270 to evaluate the TTS model(s) 260a-n operated by the TTS component 280. Based on the evaluations of the TTS model(s) 260a-n, the TTS model evaluation component 270 may select a TTS model 260a-n for further processing and/or cause re-training of one or more of the TTS model(s) 260a-n.

Figure 4A:
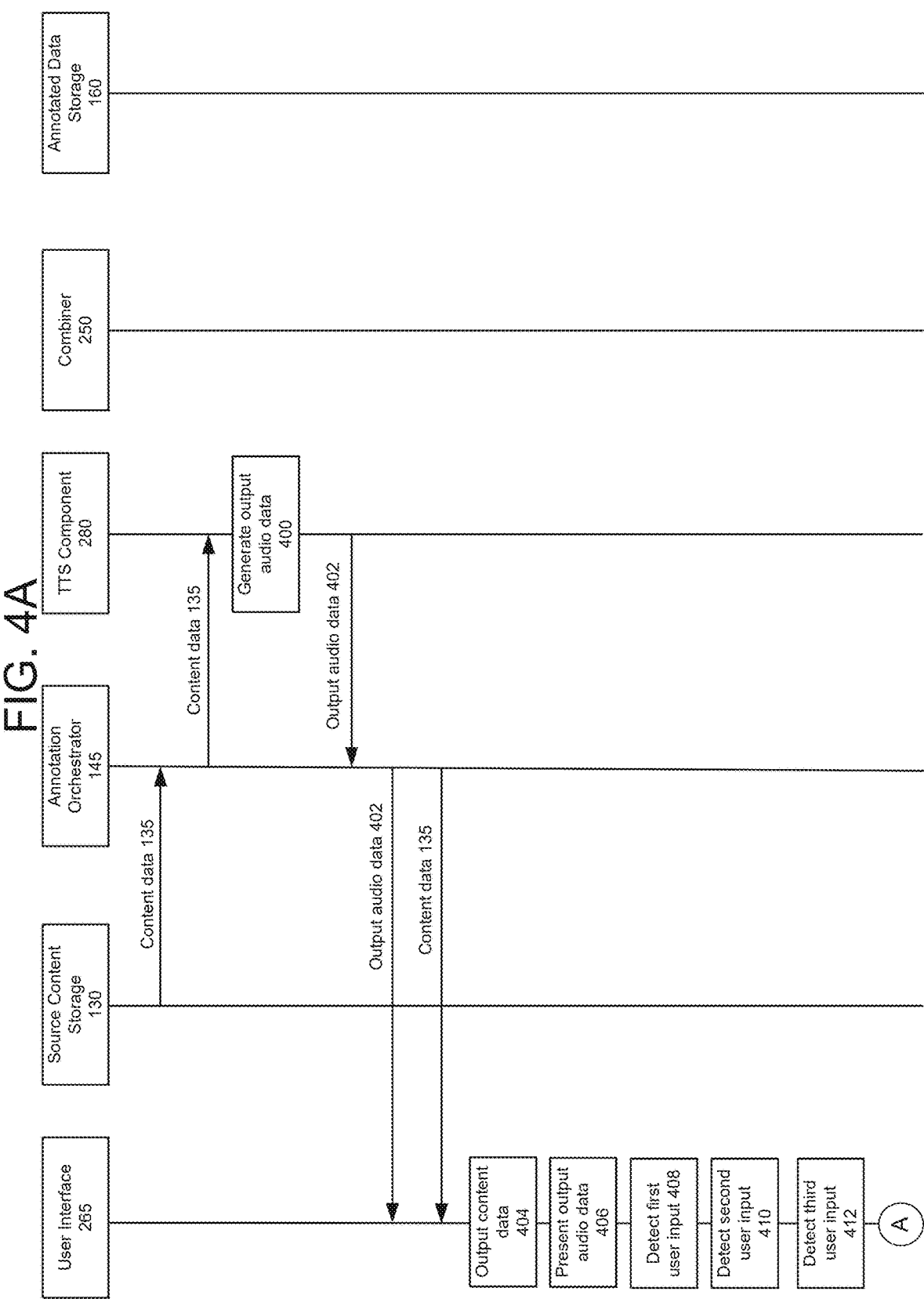
FIGS. 4A-4C are signal flow diagrams illustrating example operations for capturing and processing annotations of speech synthesis output, according to embodiments of the present disclosure.

Referring to FIG. 4A, the content data 135 may be received at the annotation orchestrator component 145 from the source content storage 130. The annotation orchestrator component 145 may be configured to orchestrate processing performed with respect to the synthesized speech annotation component 140. The source content storage 130 may include one or more instances of content data. The content data 135 may correspond to a textual and/or tokenized representation of speech and/or data associated with the textual and/or tokenized representation that was previously generated by a natural language generation (NLG) component 979 and/or a skill component 990 (described in detail herein below with respect to FIG. 9). For example, the content data 135 may be generated in response to the user 105 providing a user input to the device 110, where the system component(s) 120 (or the device 110) may generate the content data 135 as part of generating synthesized speech responsive to the user input. Alternatively, or in addition, the content data 135 may also include text selected/generated for the purposes of testing one or more TTS model(s) 260a-n. For example, the content data 135 may represent text that may test the ability of a TTS model 260a-n to generate synthesized speech having certain characteristics (e.g., prosody, intonation, speed, pause configuration, etc.). Various content data 135 may be used for present purposes.

Figure 9:
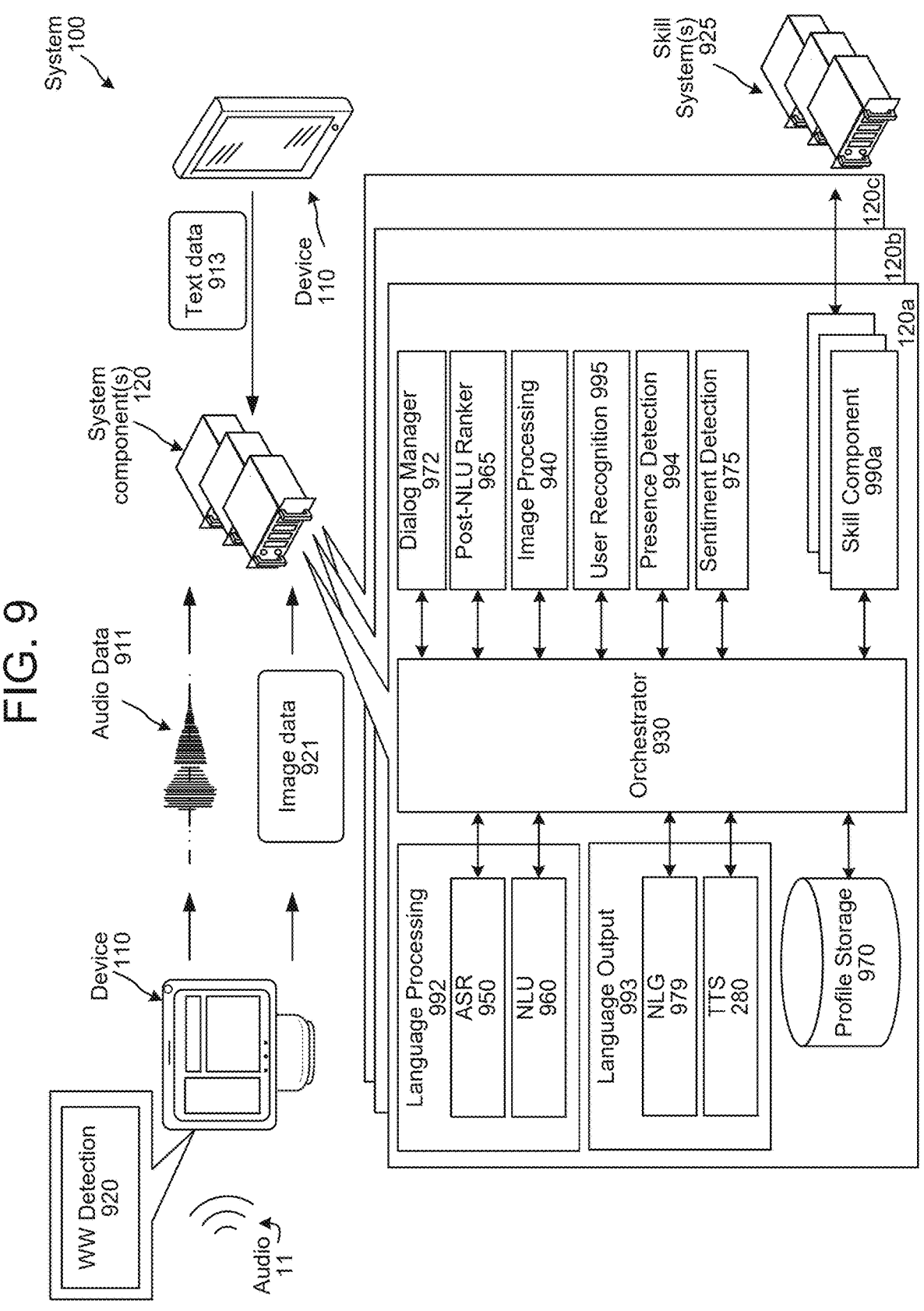
FIG. 9 is a conceptual diagram of components of the system, according to embodiments of the present disclosure.

The annotation orchestrator component 145 receives the content data 135 and may be configured to send the content data 135 to a TTS component 280, which may be operated using a TTS model 260a-n (as illustrated in FIGS. 3 and 9).

The TTS component 280 may process (e.g., using the TTS model 260a-n) the content data 135 to generate (400) output audio data 402 (e.g., synthesized speech) corresponding to the content data 135. In some embodiments, the TTS model 260a-n may not necessarily be a TTS model 260a-n that is currently being utilized during runtime operations, but rather may be a model specified for testing/evaluation purposes. The TTS component 280 may send the output audio data 402 to the annotation orchestrator component 145. In some embodiments, the annotation orchestrator component 145 may receive the output audio data 402 from the TTS component 280 without receiving the content data 135 and sending the content data 135 to the TTS component 280.

The annotation orchestrator component 145 may send the output audio data 402 and the content data 135 to the user interface component 265 for analysis/annotation by the user 105. The resulting output audio data 402 may also be stored for potential analysis at a later time (for example by a different user, or the like).

The user interface component 265 may cause the content data 135 to be output (404) to the user 105 as part of a graphical user interface (GUI). The user interface component 265 may also cause the output audio data 402 to be presented (406) to the user 105 as part of the GUI. The user interface component 265 may be configured to cause display of the GUI, and determine user inputs related thereto, including parameters corresponding to one or more GUI elements included in the GUI.

The user interface component 265 may detect (408) a first user input (e.g., a mouse input, a touch input, a keyboard input, etc.) corresponding to one or more GUI elements of the GUI presented to the user 105 by the user interface component 265 (described in more detail herein below in connection with FIGS. 5A-5B). For example, the first user input may correspond to the user 105 selecting (or otherwise indicating) a portion of the content data 135 represented by a GUI element of the GUI. In some embodiments, the first user input may indicate that the selected portion of the content data 135 corresponds to an error in the output audio data 402. For example, the error may correspond to an error with respect to a pause in the synthesized speech when generating the output audio data 402 (e.g., the pause is too long, the pause is too short, an inappropriate pause was inserted, a pause was not inserted in a location where a pause was appropriate, etc.).

The user interface component 265 may be configured to cause the GUI to change one or more GUI elements in response to a user input, such as causing selection of a radio or other virtual button corresponding to the user input or causing a portion of content data 135 to be highlighted (or otherwise indicated as being selected). For example, in response to the user 105 providing the first user input selecting the portion of the content data 135, the user interface component 265 may cause the GUI to present a bounding box 510 around the portion of content data 135 (illustrated in FIG. 5B). The user interface component 265 may further cause the GUI to display one or more additional GUI elements in response to a user input (described in more detail herein below with respect to FIGS. 5A-5B).

The user interface component 265 may further detect (410) a second user input corresponding to the user 105 indicating a category that corresponds to the error identified by the user 105 in the portion of the content data 135. (E.g., length of pause, lack of pause, incorrect location of pause, etc.)

The user interface component 265 may further detect (412) a third user input corresponding to the user 105 indicating a severity level that corresponds to the error identified by the user 105 in the portion of the content data 135. (E.g., low, medium, high, non-critical, critical, etc.)

Figure 4B:
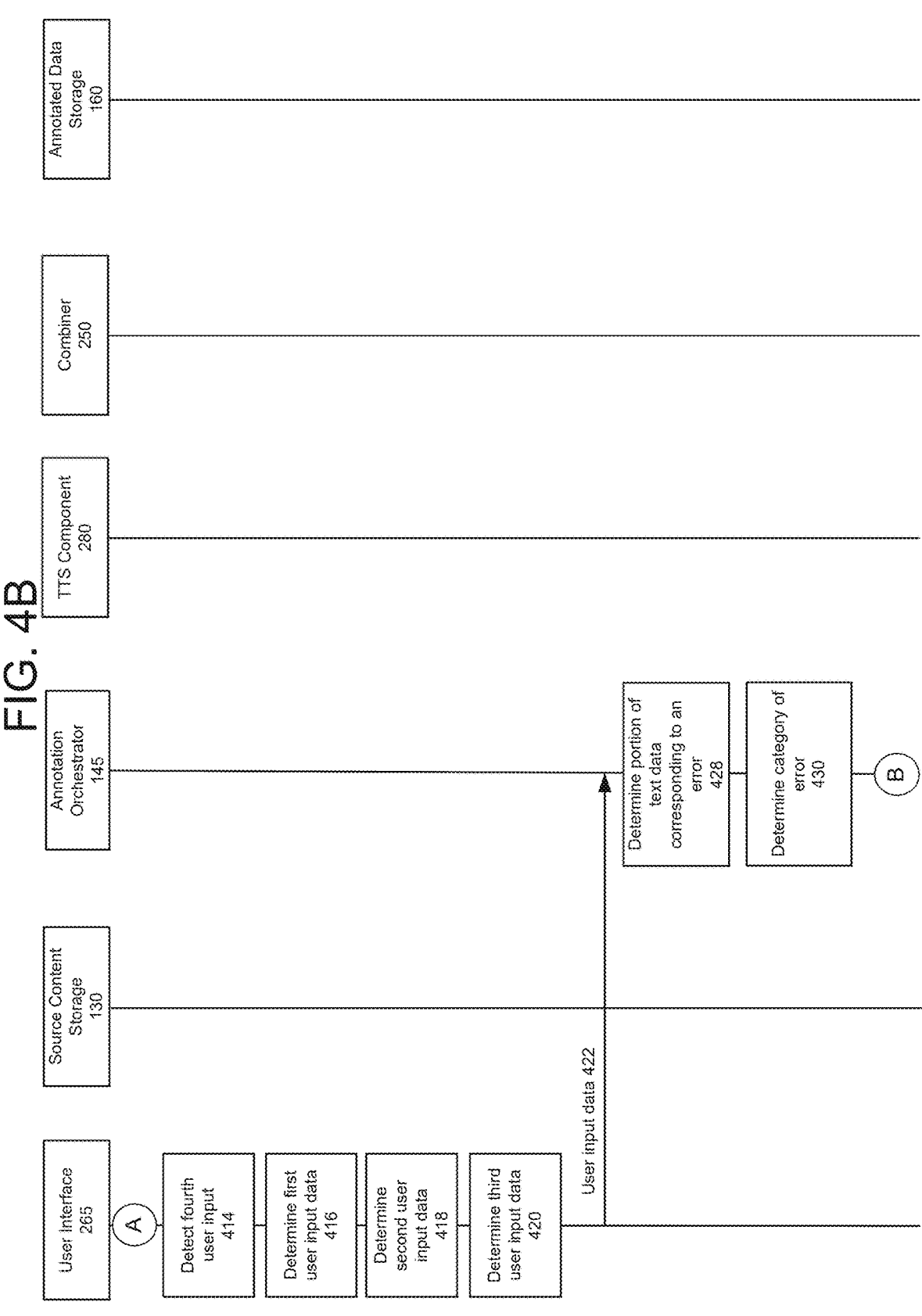

Referring to FIG. 4B, the user interface component 265 may further detect (414) a fourth user input corresponding to submission (or some other indication of a completion) of the annotation corresponding to the output audio data 402. For example, the fourth user input may correspond to a GUI element representing a selectable "submit" button (illustrated in FIG. 5B). In response to detecting (414) the fourth user input, the user interface component 265 may determine (416, 418, 420) user input data 422 representing at least the first user input, the second user input, and the third user input.

The user interface component 265 may determine the user input data 422 based on determining which GUI elements defined by the user interface component 265 are currently selected (e.g., which radio button is selected, which portion of the content data is selected, etc.). For example, if the user 105 provided a user input to a GUI element (e.g., a text field element) representing the content data 135, then the user input data 422 may include data representing the portion of the content data 135 that was selected by the user input. For further example, if a GUI element (e.g., a radio button) is selected that corresponds to an "extra pause" category, then the user input data 422 may include data representing that the "extra pause" category GUI element was selected. For further example, if a GUI element is selected that corresponds to a "high" severity level, then the user input data 422 may include data representing that the "high" severity level GUI element was selected. The user interface component 265 (or other component) may also determine the portion of the output audio data 402 corresponding to the error. For example, the user interface component 265 may match the portion of the content data 135 selected to the corresponding portion of the output audio data 402, for example using timing information. Once determined, the user interface component 265 may send the user input data 422 to the annotation orchestrator component 145.

Figure 4C:
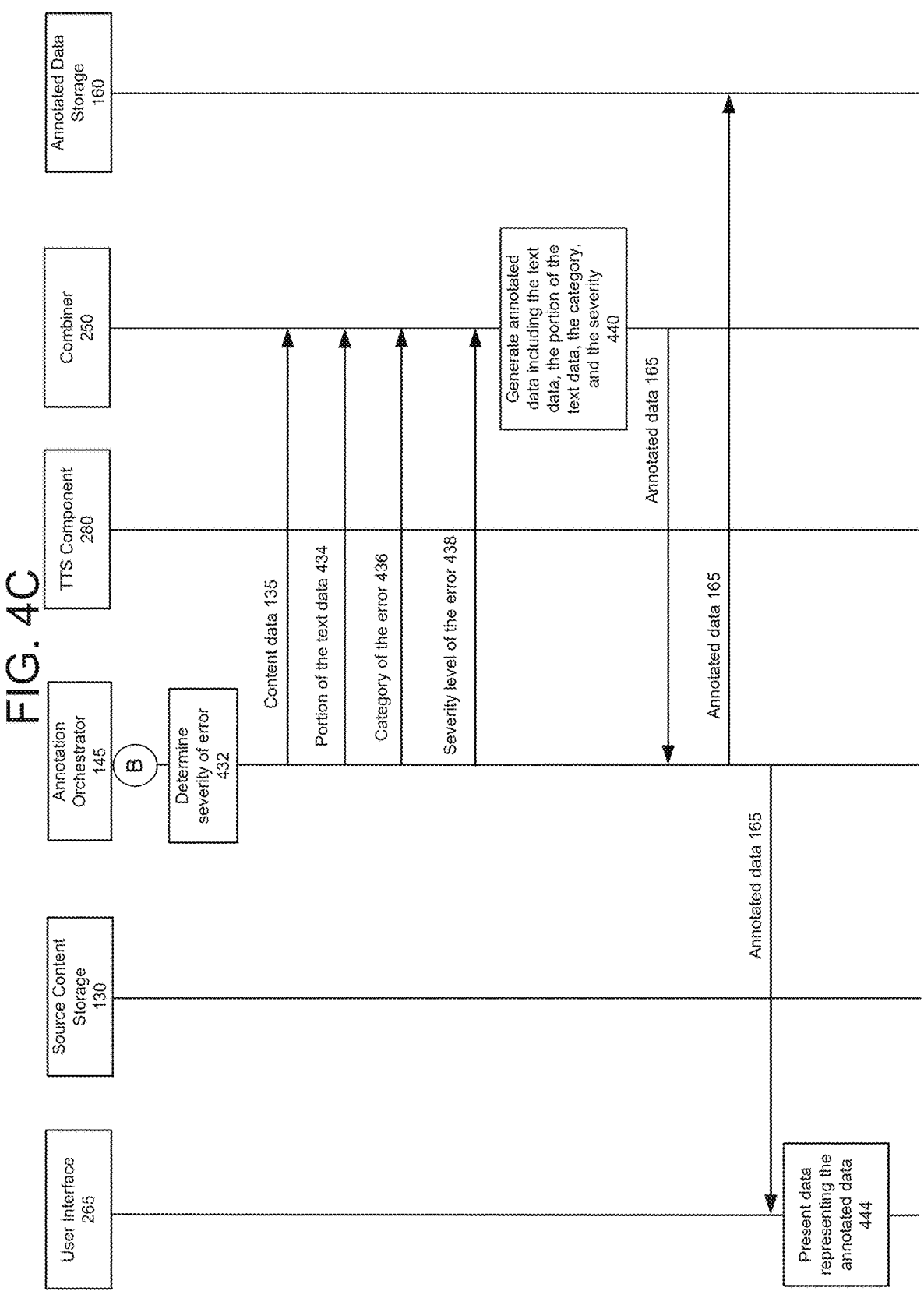

Referring to FIGS. 4B-4C, the annotation orchestrator component 145 may process the user input data 422 to determine (428) a portion 434 of the content data 135 (and/or output audio data) that the user 105 selected as including an error, determine (430) a category 436 corresponding to the error, and determine (432) the severity level 438 corresponding to the error.

In some embodiments, the category 436 corresponding to the error may correspond to a category of error that corresponds to the portion 434 of the content data 135 selected by the user 105. For example, the category of error may correspond "pause too long," "pause too short," "extra pause," and/or "missing pause."

An error corresponding to a "pause too long" error may occur when there is a pause in a location of synthesized speech where the user 105 would expect a pause, but it is longer in duration than expected (e.g., the duration exceeds a threshold of duration). For example, a "pause too long" error in synthesized speech may correspond to "I believe that [pause for 3 seconds] you are right."

An error corresponding to a "pause too short" error may occur when there is a pause in a location of synthesized speech where the user 105 would expect a pause, but it is shorter in duration than expected (e.g., the duration fails to meet a threshold of duration). For example, a "pause too short" error in synthesized speech may correspond to "Anyone who is actively pursuing a goal or dream is never a failure—[pause for 0.1 seconds] they are a success in progress."

An error corresponding to an "extra pause" may occur when there is a pause in a location of synthesized speech where the user 105 would not expect a pause. For example, an "extra pause" error in synthesized speech may correspond to "Me, [pause] too."

An error corresponding to a "missing pause" may occur when there is no pause in a location of synthesized speech where the user 105 would expect a pause, and when there are no other sufficient prosodic boundary marking(s) (lengthening, pitch, and/or voice quality changes) to compensate for the lack of a pause. For example, a "missing pause" error in synthesized speech may correspond to "This is my wife, Pam, [missing pause] and she's a dancer."

In some embodiments the severity level 438 corresponding to the error may correspond to "low," "medium," or "high," or the like. In some embodiments, the severity level 438 corresponding to the error may correspond to "non-critical" or "critical," or the like. A "high" or "critical" severity level may, for example, indicate that the error represented in the synthesized speech is ungrammatical and will likely result in an unsatisfactory user experience (e.g., an error that the user 105 believes a human would not make under normal, fluent speaking conditions). A "medium" or "non-critical" severity level may, for example, indicate that the error represented in the synthesized speech is unidiomatic or unideal, and is not as likely to result in an unsatisfactory user experience as a "high" or "critical" severity level error (e.g., an error which may be appropriate in other contexts, but that which a professional narrator would not make in the given context). Other severity levels may be configured depending on the metrics the system 100 wishes to evaluate, and may vary depending on error type, etc.

Referring to FIG. 4C, the annotation orchestrator component 145 may send the content data 135, the portion 434 of the content data 135, the category 436 corresponding to the error, and the severity level 438 corresponding to the error to the combiner component 250. In some embodiments, the annotation orchestrator component 145 may additionally send the output audio data 402 corresponding to the content data 135 to the combiner component 250.

The combiner component 250 may process the content data 135, the portion 434 of the content data 135, the category 436 corresponding to the error, and the severity level 438 corresponding to the error, and generate (440) annotated data 165. The annotated data 165 may include representations of the content data 135, the portion 434 of the content data 135, the category 436 corresponding to the error, and/or the severity level 438 corresponding to the error. For example, the annotated data 165 may represent the content data 135 which may be tagged/labeled with tags/labels representing the portion 434 of the content data 135, the category 436 corresponding to the error, and/or the severity level 438. In other embodiments, the annotated data 165 may represent a vector including the content data 135, the portion 434 of the content data 135, the category 436 corresponding to the error, and/or the severity level 438 corresponding to the error. In further embodiments, the annotated data 165 may represent a concatenation of the content data 135, the portion 434 of the content data 135, the category 436 corresponding to the error, and/or the severity level 438 corresponding to the error.

In some embodiments, where the annotation orchestrator component 145 additionally sends the output audio data 402 corresponding to the content data 135 to the combiner component 250, the annotated data 165 may further include a representation of the output audio data 402. In such embodiments, the output audio data 402 may include tags/labels, similar to those discussed above. The combiner component 250 may send the annotated data 165 to the annotation orchestrator component 145.

The annotation orchestrator component 145 may send the annotated data 165 to the annotated data storage 160. The annotated data storage 160 may include one or more instances of annotated data generated by the synthesized speech annotation component 140. In some embodiments, the annotated data 165 is stored along with data indicating that a particular TTS model 260*a-n* was used to generate, using the content data 135, the output audio data that was evaluated.

In some embodiments, the annotation orchestrator component 145 may use the annotated data 165 to cause re-training/adjustment of the TTS model 260*a-n* based on the annotated data 165 (as described herein below in connection with the TTS model evaluation component 270).

The annotation orchestrator component 145 may send the annotated data 165 to the user interface component 265. The user interface component 265 may cause the GUI to present the annotated data 165. For example, the user interface component 265 may cause the GUI to present the user 105 with data representing the content data 135, the portion 434 of the content data 135, the category 436 corresponding to the error, and the severity level 438 corresponding to the error. In some embodiments, the user interface component 265 may cause the GUI to present (444) the user 105 with data representing the content data 135, the portion 434 of the content data 135, the category 436 corresponding to the error, and the severity level 438 corresponding to the error in response to the user interface component 265 detecting (414) the fourth user input.

Figure 5A:
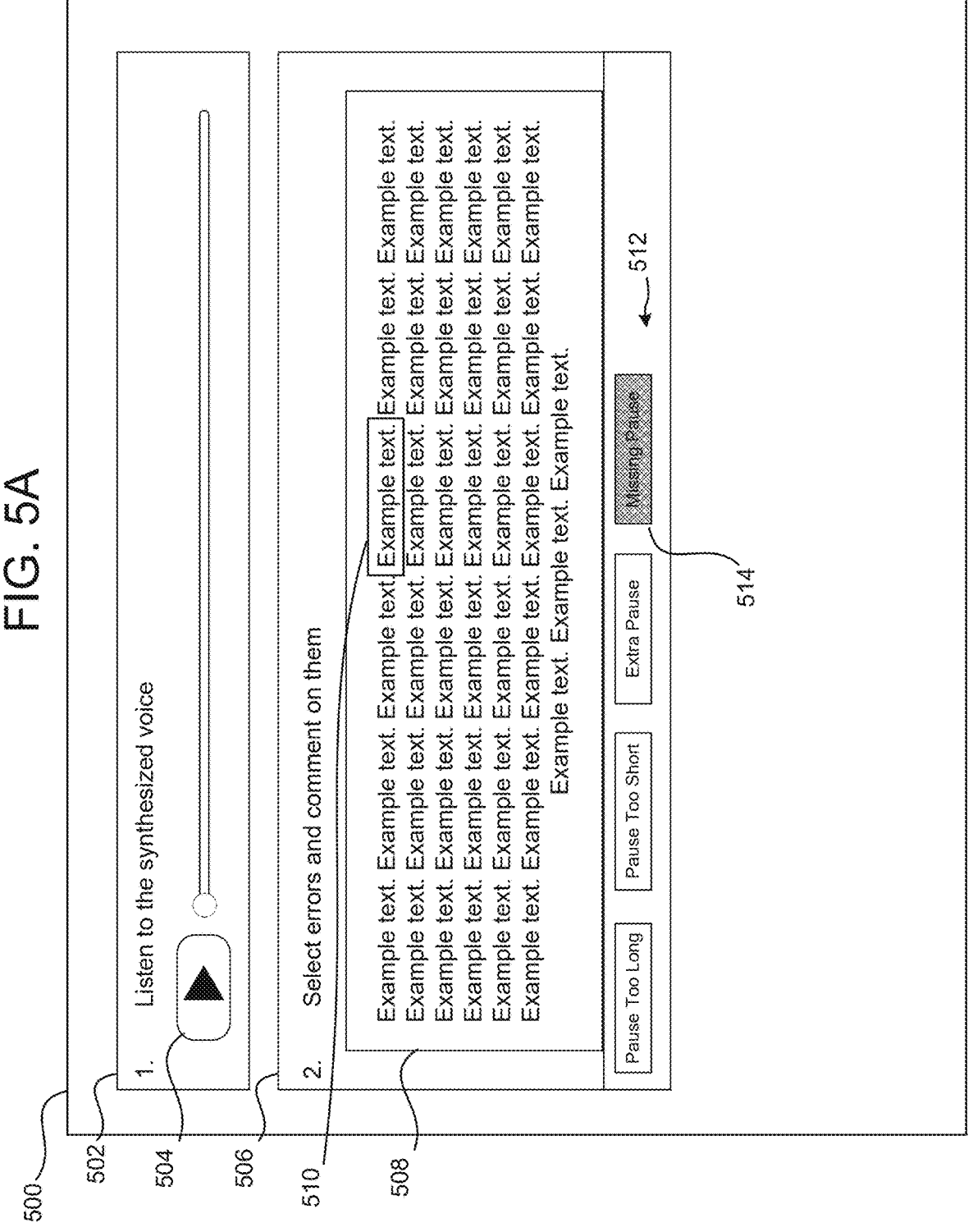
FIGS. 5A-5B illustrate an example user interface for use in analyzing synthesized speech output, according to embodiments of the present disclosure.
Figure 5B:
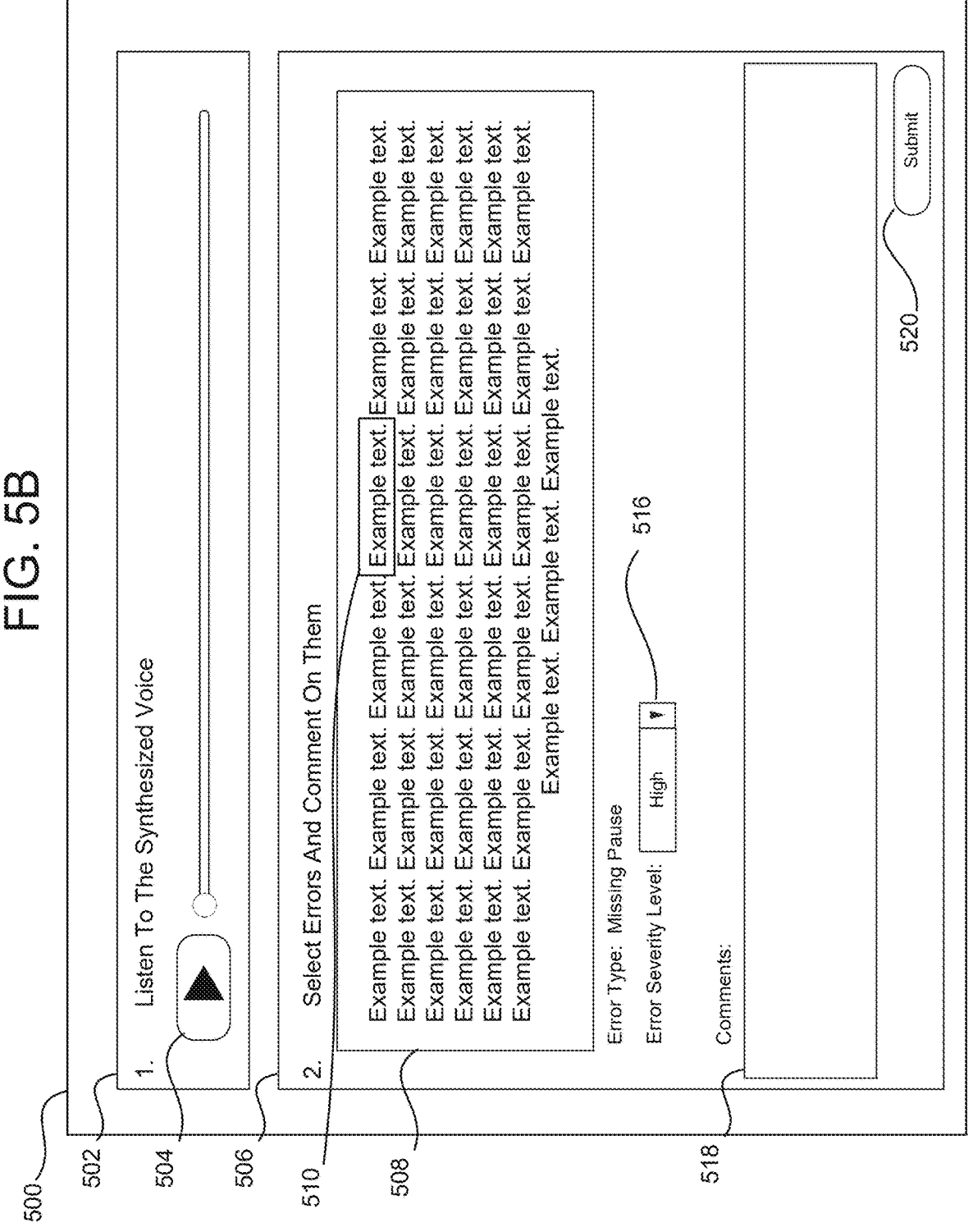

FIGS. 5A-5B illustrate an example GUI 500 displayed by the user interface component 265 comprising one or more GUI elements to which the user 105 may provide annotations to synthesized speech presented by the GUI 500. Referring to FIG. 5A, the GUI 500 may include a first set of GUI elements 502 configured to allow the user 105 to listen to the synthesized speech. For example, the first set of GUI elements 502 may include an audio player GUI element 504 configured to present the synthesized speech (e.g., the output audio data 402) to the user 105. The user 105 may select the audio player GUI element 504 and listen to the synthesized speech to determine if there are any errors in the synthesized speech.

The GUI 500 may further include a second set of GUI elements 506 configured to allow the user 105 to provide annotations to the synthesized speech. For example, the second set of GUI elements 506 may include a text field GUI element 508 representing content data (e.g., the content data 135) corresponding to the output audio data (e.g., the output audio data 402). If the user 105 determines there is an error in the synthesized speech (e.g., when listening to the synthesized voice output by the audio player GUI element 504), the user 105 may select a portion of the content data 135, represented by the text field GUI element 508, which corresponds to the portion of the synthesized speech where the error was detected. In response to the user 105 selecting the portion of the content data 135 represented by the text field GUI element 508, the user interface component 265 may cause the GUI 500 to display an indication that the portion of the content data 135 was selected (e.g., a bounding box 510, as illustrated in FIGS. 5A-5B). The second set of GUI elements 506 may further include a set of one or more radio buttons 512. The set of radio buttons 512 may allow selection of one radio button of the set; if a second button of the set is selected, the first button may be deselected. The set of radio buttons 512 may correspond to one or more categories of error to which the selected portion of the content data 135 corresponds. For example, the set of radio buttons 512 may include a first button corresponding to a "pause too long" category, a second button corresponding to a "pause too short" category, a third button corresponding to an "extra pause" category, and a fourth button (e.g., the radio button 514) corresponding to a "missing pause" category.

As shown in FIG. 5A, the user 105 may listen to the synthesized voice, determine there is an error (e.g., a missing pause) in the synthesized speech, provide a first user input selecting the portion of the content data 135 represented by the text field GUI element 508 which corresponds to the portion of the synthesized speech where the error was detected, and provide a second user input selecting a button of the set of radio buttons 512 which corresponds to the category of error detected (e.g., the fourth button 514 which corresponds to the "missing pause" category). In response to detection of the first user input and the second user input, the user interface component 265 may cause the GUI 500 to present one or more additional GUI elements, as represented in FIG. 5B. In some embodiments, the user interface component 265 may cause the GUI 500 to present the one or more additional GUI elements without requiring the user 105 to provide the first user input and the second user input.

As illustrated in FIG. 5B, the user interface component 265 may cause the GUI 500 to further present the one or more additional GUI elements. The one or more additional GUI elements may be configured to allow the user 105 to provide further annotations to the synthesized speech. The one or more additional GUI elements may include a drop-down menu GUI element 516 including options corresponding to an error "severity level" corresponding to the error. As discussed above, the error "severity level" may include a "low" option, a "medium" option, a "high" option, and/or a "non-critical" option and a "critical" option. The one or more additional GUI elements may further include a text field GUI element 518, where the user 105 may provide text input representing why the user 105 selected the portion of the content data 135 as including an error and any other information relevant to the identification of the error.

The one or more additional GUI elements may further include a selectable button 520 configured to submit data representing the annotation corresponding to the synthesized speech. After the user 105 has selected the portion of the content data 135 represented by the text field GUI element 508 which corresponds to the portion of the synthesized speech where the error was detected, selected a radio button (e.g., the fourth button 514) of the set of radio buttons 512 corresponding to an error category for the error, and selected a "severity level" for the error from the drop-down menu GUI element 516 (and, optionally, provided a text input to the text field GUI element 518), the user 105 may submit the annotation using the selectable button 520.

In response to detecting the user input corresponding to the selectable button 520, the user interface component 265 may determine the user input data 422 corresponding to the GUI elements to which the user 105 provided user inputs (e.g., the selected portion of the content data included in the text field GUI element 508, the category corresponding to the error represented by the selected radio button 514, and the severity level corresponding to the error "severity level" option of the drop-down menu GUI element 516 selected (and optionally text data corresponding to the user's 105 text input to the text field GUI element 508), and may send the user input data 422 to the annotation orchestrator component 145, which may process as discussed above with respect to FIGS. 4B-4C.

The processes discussed above in reference to FIGS. 4A-4C and FIGS. 5A-5B may be repeated using different users, different content data 135, where the TTS component 280 synthesizes the speech with different models 260a-n, etc. In this way the system may gather annotation data representing how different users view the same synthesized speech, how one model produces synthesized speech for different text segments, how different models are used to produce different synthesized speech based on the same set of text, etc. The resulting data may be used for various model analysis and/or retraining purposes. For example, in some embodiments, when the system 100 gathers annotation data from more than one user, the system 100 may compare annotation data gathered from a first user with annotation data gathered from a second user. The system 100 may determine a similarity score, based on the comparison, which represents a level of agreement between the first user and the second user with respect to errors determined in an instance of output audio data. In some embodiments, the similarity score may represent a level of reliability associated with the annotation data of the first user and the annotation data of the second user with respect to the output audio data. The system 100 may, based on the similarity score failing to meet a threshold score, determine to not store the resulting annotated data.

In some embodiments, the system 100 may further include a component configured to predict annotated data 165 from output audio data 402. The component may implement a machine learning (ML) model configured to take as input an instance of output audio data 402 and generate annotated data 165 (e.g., representing a portion of the output audio data 402 where the error is located, a category of the error, and a severity level of the error, etc.) representing one or more pause prediction errors in the output audio data. The ML model may be trained using a corpus of training output audio data and training annotated data, where the ML model is given an instance of output audio data and is tasked with generating corresponding annotated data. Based on a comparison of the generated annotated data and the training annotated data, the ML model may be reconfigured accordingly.

In some instances the synthesized speech annotation component 140 may be configured to generate training and/or test set data using the annotated data 165. The synthesized speech annotation component 140 may use the training/test set data for evaluating and/or training/retraining TTS models (e.g., the TTS models 260a-n). In some embodiments, the synthesized speech annotation component 140 may generate the test set data using the test set generator component 255.

Figure 6:
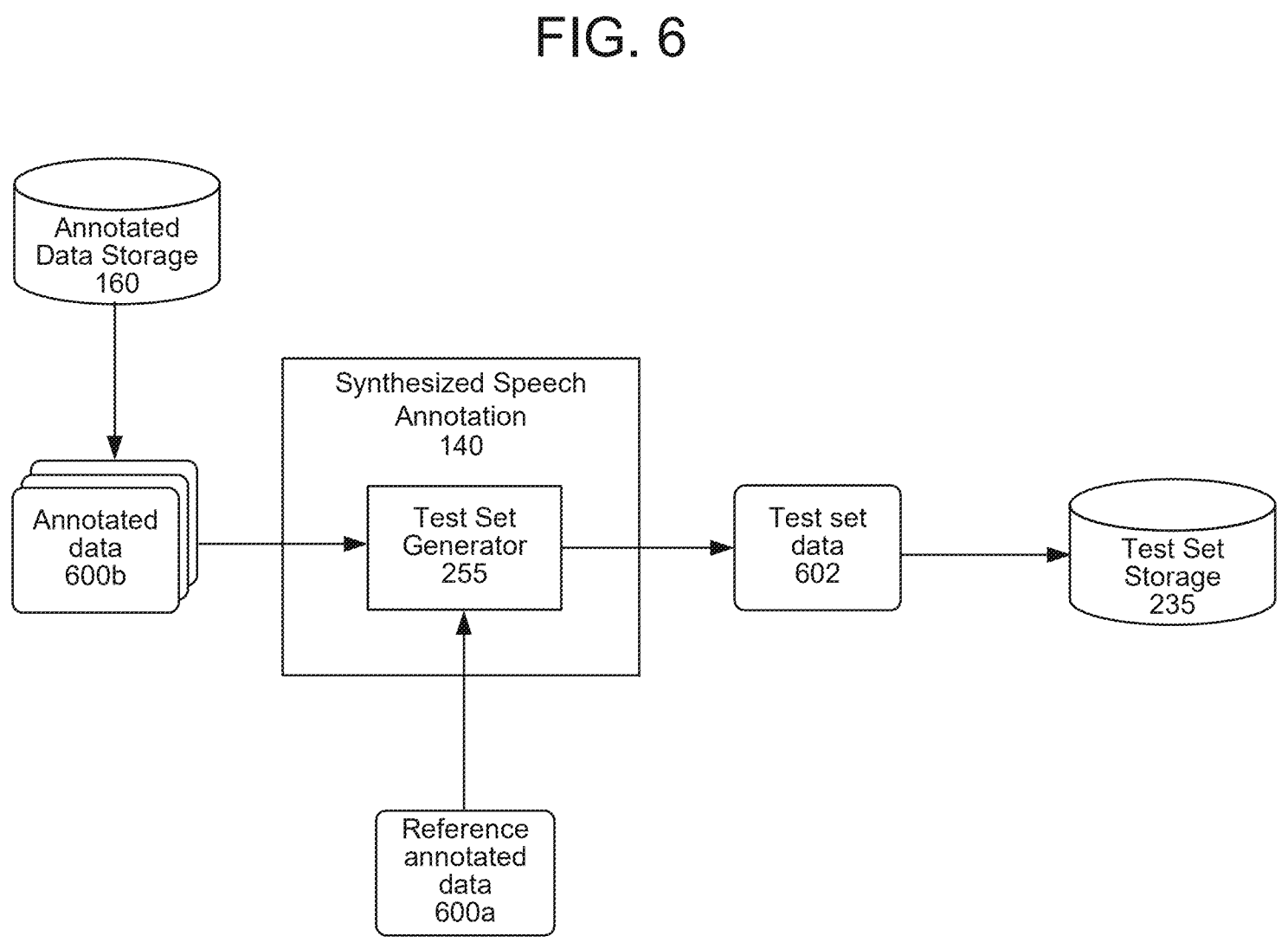

As illustrated in FIG. 6, the test set generator component 255 may be configured to take as input an instance of reference annotated data 600a (e.g., the annotated data 165) and one or more further instance(s) of annotated data 600b-n, and generate test set data 602 therefrom. The system 100 may generate multiple different groups of test set data 602. Each collection of test set data 602 may group different annotated data sets that are similar in some way. For example, multiple user evaluations of the same output audio data may be grouped together. In another example, multiple different annotated data sets related to different output audio data (created using different TTS models) based on the same underlying content data (e.g., text data) may be grouped together. In another example, multiple different annotated data sets related to different output audio data based on semantically/syntactically similar underlying content data (e.g., text data) may be grouped together. Thus the system 100 may create different collections of test set data 602 which may be used for various purposes. The test set generator component 255 may further be configured to generate training data, separate from the test set data 602. In some embodiments, the training data may be the same as the test set data 602, but may be stored in a different storage than the test set data 602.

The test set generator component 255 may query the annotated data storage 160 for the instance of reference annotated data 600*a*. As stated above, the reference annotated data 600*a* may include a representation of content data 135 corresponding to synthesized speech, a portion 434 of the content data 135 including an error identified by a user (e.g., the user 105), a category 436 corresponding to the error, and a severity level 438 corresponding to the error. In some instances, the test set generator component 255 may receive the reference annotated data 600*a* from the annotation orchestrator component 145 after the annotation orchestrator component 145 generates the annotated data 165.

The test set generator component 255 may further query the annotated data storage 160 for one or more further instances of annotated data 600*b-n*. The one or more further instances of annotated data 600*b-n* may correspond to a corpus of annotated data.

The test set generator component 255 may determine, from among the one or more further instances of annotated data 600*b-n*, annotated data that includes content data (e.g., text data) that is similar to the content data 135 (e.g., text data) represented in the reference annotated data 600*a*. The test set generator component 255 may implement a trained model configured to determine annotated data that includes content data that is syntactically similar to the content data 135 represented in the reference annotated data 600*a* (e.g., sentence structure), semantically similar to the content data 135 represented in the reference annotated data 600*a* (e.g., similar subject, content, etc.), and/or includes writing conventions that are similar to those of the content data 135 represented in the reference annotated data 600*a* (e.g., similar punctuation). For example, the trained model may be trained using input context data (e.g., text data) and a corpus of content data (e.g., text data), where the trained model is tasked with determining which instances of content data in the corpus of content data is syntactically and/or semantically similar to the input content data. In this way the resulting test set data 602 may include data related to annotations of different models' TTS output that are based on the same/similar underlying content.

The test set generator component 255 may thus generate test set data 602 including the reference annotated data 600*a* and the one or more further instances of annotated data 600*b-n* determined to be similar to the reference annotated data 600*a*. The test set generator component 255 may send the test set data 602 to the test set storage 235. In some embodiments, the test set data 602 includes a label representing a syntactical and/or semantic representation of the test set data 602 (e.g., "lists," "heavy subject," etc.). The test set storage 235 may include one or more instances of test set data 602 generated by the test set generator component 255.

In some embodiments, the synthesized speech annotation component 140 may be configured to select and/or retrain the TTS model(s) 260*a-n* using the test set data 602 (or training data generated by the test set generator component 255, similar to the processes described above to generate the test set data 602). In some embodiments, the synthesized speech annotation component 140 may select and/or train the TTS model(s) 260*a-n* using the TTS model evaluation component 270.

Figure 7:
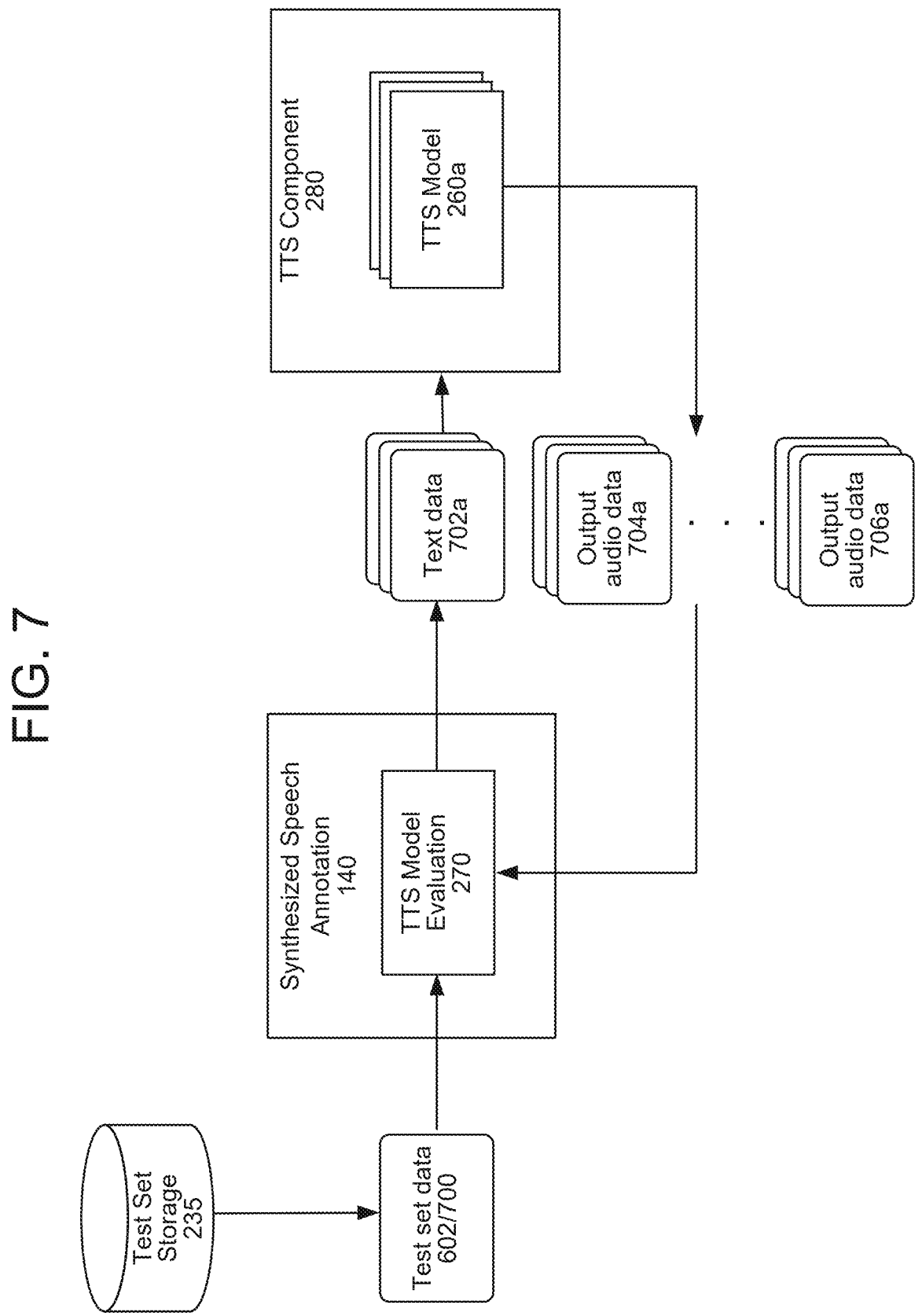
FIG. 7 is a conceptual diagram illustrating example processing that may be performed by a text-to-speech (TTS) model evaluation component, according to embodiments of the present disclosure.

As illustrated in FIG. 7, The TTS model evaluation component 270 may query the test set storage 235 for test set data 602/700, determine one or more instances of content data 702*a-n* (e.g., text data) corresponding to the test set data 602/700, and send the one or more instances of content data 702*a-n* to the TTS component 280 operating the TTS model(s) 260*a-n*. In some instances, the TTS model evaluation component 270 may send the one or more instances of content data 702*a-n* to the TTS component 280 operating each of the TTS model(s) 260*a-n* to be evaluated one instance of content data at a time.

The TTS component 280 may operate using the respective TTS model(s) 260*a-n* to process the one or more instances of content data 702*a-n* to determine one or more instances of output audio data 704*a-n*-706*a-n*, and may send the one or more instances of output audio data 704*a-n*-706*a-n* to the TTS model evaluation component 270.

Figure 8:
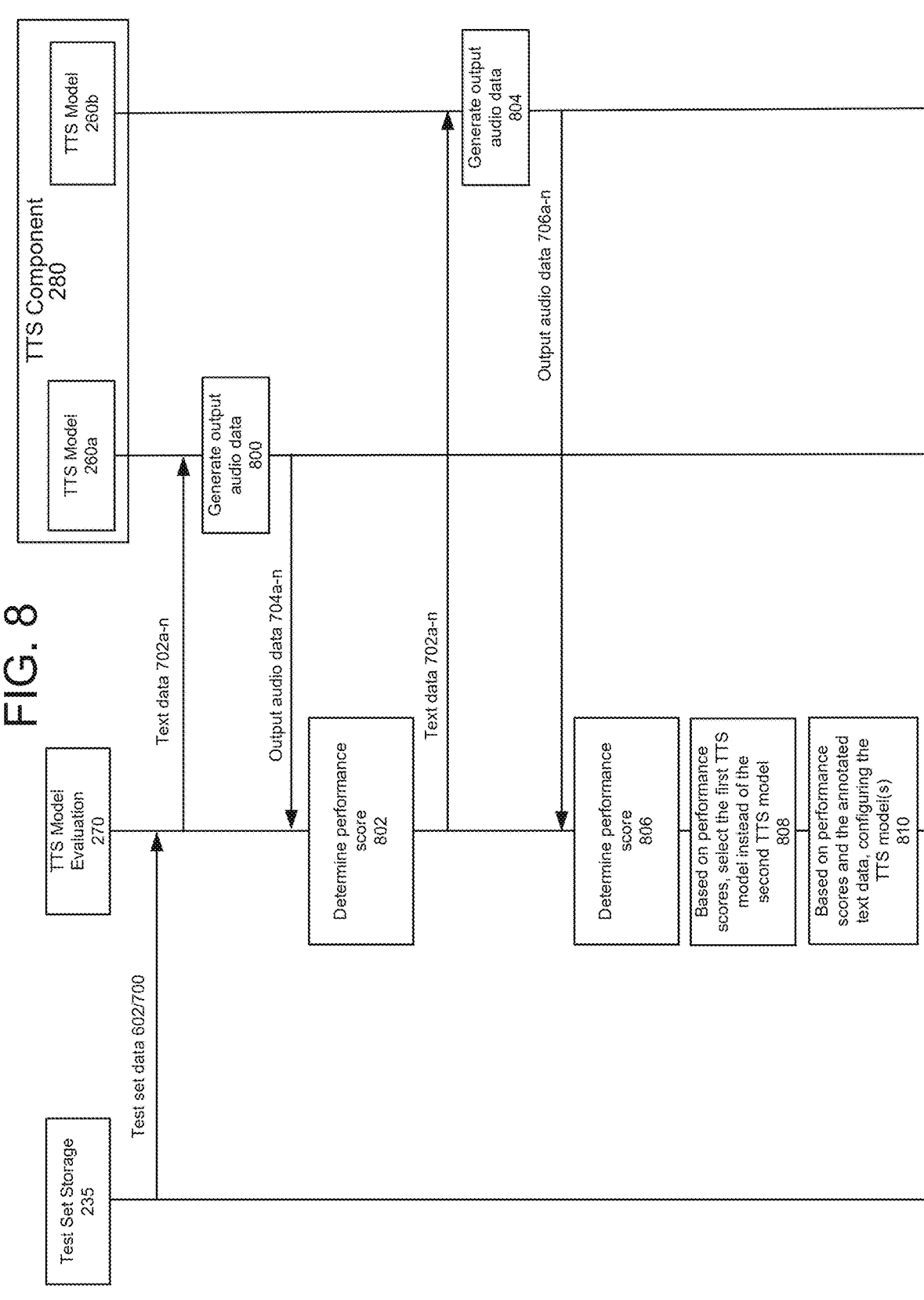
FIG. 8 is a signal flow diagram illustrating example operations of the TTS model evaluation component, according to embodiments of the present disclosure.

For example, as illustrated in FIG. 8, the TTS model evaluation component 270 may receive the test set data 602/700 from the test set storage 235, determine one or more instances of content data 702*a-n* included in the test set data, and send the one or more instance of content data 702*a-n* to the TTS component 280 operating the TTS model 260*a* and the TTS model 260*b*.

The TTS component 280 operating TTS model 260*a* and the TTS model 260*b* may process the one or more instances of content data 702*a-n* to generate (800, 804) one or more instances of output audio data 704*a-n*, 706*a-n*, respectively, and send the one or more instances of output audio data 704*a-n*, 706*a-n* to the TTS model evaluation component 270. In some embodiments, the TTS model 260*a* and the TTS model 260*b* may be evaluation TTS models (e.g., TTS models that are not currently being used for runtime operations).

The TTS model evaluation component 270 may process the one or more instances of output audio data 704*a-n*, 706*a-n* generated using the TTS model 260*a* and the TTS model 260*b*, and determine (802, 806) a performance score for the TTS model 260*a* and the TTS model 260*b*, respectively.

In some embodiments, the TTS model evaluation component 270 may determine a performance score for the TTS model(s) 260*a-n* using the test set data 602/700 and the one or more instances of output audio data 704*a-n*, 706*a-n* generated using the TTS model(s) 260*a-n*. The TTS model evaluation component 270 may use an instance of annotated data from the test set data 602/700 to determine if the corresponding output audio data generated using the TTS model 260*a-n* includes an error in the portion of the output audio data corresponding to the portion 434 of the content data 135 included in the annotated data. The TTS model evaluation component 270 may then determine a performance score for the TTS model(s) 260*a-n* based on whether the output audio data generated using the TTS model(s) 260*a-n* included and/or did not include the error identified in the corresponding annotated data. The TTS model evaluation component 270 may determine a performance score for the TTS model(s) 260*a-n* based on the test set data 602/700 (e.g., by taking an average of performance scores determined for the annotated data and corresponding output audio data pairs in the test set data 602/700).

In some embodiments, the TTS model evaluation component 270 may determine a performance score for the TTS model(s) 260*a-n* based further on the category and/or severity level of the error detected in the synthesized speech. In some embodiments, the first performance score may represent an accuracy of one or more pauses included in output audio data generated by the TTS model(s) 260*a-n*. For example, the TTS model evaluation component 270 may determine (806) a first performance score for the TTS model 260*b* used to produce output audio data 706*a-n* that included a "pause too long" category of error that corresponded to a severity level of "high" in the corresponding annotated data. The TTS model evaluation component 270 may also determine a second performance score for the TTS model 260a that is higher than the first performance score, based on the TTS model 260a producing output audio data that only included a "pause too long" category of error that corresponded to a severity level of "medium" in the corresponding annotated data.

In some embodiments, the annotation orchestrator component 145 may send the annotated data 165 to the TTS model evaluation component 270, and the TTS model evaluation component 270 may send only the content data 135 included in the annotated data 165 (rather than the test set data 602/700) to the TTS component 280 (to be processed using the TTS model 260a and the TTS model 260b), and may determine (802, 806) a performance score for the TTS model 260a and the TTS model 260b based on the output audio data 704a, 706a and the annotated data 165, respectively.

The TTS model evaluation component 270 may determine that output audio data received from the particular TTS model(s) 260a-n includes an error. This may be accomplished using a trained model configured to determine whether output audio data generated by the TTS model(s) 260a-n includes the same error as was identified in corresponding annotated data. In some embodiments, where the annotated data 165 includes the original output audio data 402 that was evaluated, the trained model may compare the output audio data 704a-n-706a-n generated by the TTS model(s) 260a-n with the output audio data 402 included in the annotated data 165. The trained model may be trained to perform this evaluation using a labeled corpus of output audio data and annotated data pairs, where the model is tasked with predicting whether the output audio data includes the same error as identified in the corresponding annotated data. Based on whether the model correctly predicted that the output audio data includes the same error or not, the model is retrained accordingly.

This process of evaluation by the TTS model evaluation component 270 may allow the system to evaluate the performance of various TTS model(s) 260a-n without necessarily repeating the human evaluation as described above with regard to FIGS. 4A-5B. That is, once sufficient annotation data is created based on the operation of the human evaluators, the automated operations of FIG. 8 may be performed without requiring further human evaluation of synthesized speech determined using specific TTS models 260a-n.

The TTS model evaluation component 270 (or other component(s)) may use the performance scores to perform a variety of tasks. For example, using the scores the system 100 may select one TTS model over another for a particular TTS task, such as creating synthesized speech in response to a runtime user request. In one configuration, the particular user request may result in certain NLU data (such as an intent indicator or the like that may be output by an NLU component such as 960 discussed below) which may, in some manner, be associated with the annotated data and/or original output audio data 402 that was used to determine the particular test set data. The system 100 may then select a particular TTS model 260a-n that performed well (e.g., had a high performance score) in the category of the particular test set data 602 that both corresponded to the intent indicator and the performance score. That particular well-evaluated TTS model 260a-n may be used to respond to (e.g., create synthesized speech responding to) the user input.

In some embodiments, the system 100 may associate a category (e.g., based on an error type, error severity) with a particular instance of test set data 602, such that the particular instance of test set data 602 may be identified and used to evaluate one or more TTS models 260a-n for a particular TTS task associated with that category. For example, the system 100 may select a particular instance of test set data 602 associated with a "category: pause too long; severity: high" category in order to evaluate one or more TTS models 260a-n based on their ability to predict pauses that are not longer than appropriate. Alternatively, or in addition, the system 100 may associated a category with a particular instance of test set data 602 based on content of the content data 135 (e.g., the text data) included in the annotated data 165, punctuation type of the content data 135 (e.g., text data) included in the annotated data 165, a model identifier corresponding to the TTS model 260a-n that generated the original output audio data, settings configuration(s) of the TTS model 260a-n that generated the original output audio data, an intent indicator associated with a user request associated with the annotated data 165, and/or any other data associated with the annotated data 165 included in the test set data 602. For example, the system 100 may identify and select a particular instance of test set data 602 associated with a "syntax: lists" category in order to evaluate one or more TTS models 260a-n based on their ability to predict pauses in content data 135 (e.g., text data) that include lists of information. For further example, the system 100 may identify and select a particular instance of test set data 602 associated with a "content type: emotional" category in order to evaluation one or more TTS models 260a-n based on their ability to predict pauses in content data 135 (e.g., text data) that include content associated with a high level of emotion.

For example, the TTS model evaluation component 270 (or other component(s)) may use the performance scores to select (808) a first TTS model 260a over a second TTS model 260b for performing further processing. For example, if the TTS model evaluation component 270 determines that the first TTS model's 260a performance score is higher than the second TTS model's 260b performance score, then the TTS model evaluation component 270 may determine that the first TTS model 260a is better configured for generating output audio data 704a-n corresponding to content data 702a-n similar to the test set data 602/700 than the second TTS model 260b. As such, the TTS model evaluation component 270 may select the first TTS model 260a for performing further processing instead of the second TTS model 260b.

In some embodiments, the TTS model evaluation component 270 may query the test set storage 235 for a particular instance of test set data 602/700. For example, the TTS model evaluation component 270 may send data representing a desired quality associated with an instance of test set data 602/700. In some embodiments, the desired quality may be a label, or an example instance of content data (e.g., text data). In some embodiments, the TTS model evaluation component 270 may send data including an example instance of content data 135 (e.g., text data) to the test set generator component 255 representing a request for generation of test set data 602/700 similar to the instance of content data 135.

Alternatively, or in addition, the TTS model evaluation component 270 may use the performance scores to retrain/configure (or cause the retraining/configuring (810) of) the TTS model(s) 260a-n. For example, if the performance score for the TTS model(s) 260a-n indicates that the TTS model(s) 260a-n performed poorly (e.g., had a low performance score, had a lower performance score than another speech model), then the TTS model evaluation component

270 can retrain/configure (or cause the retraining/configuring of) the TTS model(s) 260*a-n* based on the test set data 602/700 (e.g., label associated with the test set data 602/700, the syntactical/semantic structure/interpretation of the test set data 602/700, the category 436 corresponding to the error, etc.). In some embodiments, where the TTS model evaluation component 270 uses the performance scores to retrain/configure the TTS model(s) 260*a-n*, the TTS model evaluation component 270 may instead send training data (generated by the test set generator component, as discussed above) to the TTS model(s) 260*a-n*, and may determine the performance scores based on the corresponding output audio data generated by the TTS model(s) 260*a-n* using the training data.

The system 100 may operate using various components as described in FIG. 9. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system component(s) 120. In at least some embodiments, such determination may be made using a wakeword detection component 920. The wakeword detection component 920 may be configured to detect various wakewords. In at least some examples, each wakeword may correspond to a name of a different digital assistant. An example wakeword/digital assistant name is "Alexa." In another example, input to the system may be in form of text data 913, for example as a result of a user typing an input into a user interface of device 110. Other input forms may include indication that the user has pressed a physical or virtual button on device 110, the user has made a gesture, etc. The device 110 may also capture images using camera(s) 1018 of the device 110 and may send image data 921 representing those image(s) to the system component(s) 120. The image data 921 may include raw image data or image data processed by the device 110 before sending to the system component(s) 120. The image data 921 may be used in various manners by different components of the system to perform operations such as determining whether a user is directing an utterance to the system, interpreting a user command, responding to a user command, etc.

The wakeword detection component 920 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

In some implementations, wakeword detection is performed without performing linguistic analysis, textual analysis, or semantic analysis. In other implementations, the audio data, representing the audio 11, is analyzed to determine if specific characteristics of the audio data match preconfigured acoustic waveforms, audio signatures, or other data corresponding to a wakeword.

Thus, the wakeword detection component 920 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc.

There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 920 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 920 and/or input is detected by an input detector, the device 110 may "wake" and begin transmitting audio data 911, representing the audio 11, to the system component(s) 120. The audio data 911 may include data corresponding to the wakeword; in other embodiments, the portion of the audio corresponding to the wakeword is removed by the device 110 prior to sending the audio data 911 to the system component(s) 120. In the case of touch input detection or gesture based input detection, the audio data may not include a wakeword.

In some implementations, the system 100 may include more than one system component 120. The system component(s) 120 may respond to different wakewords and/or perform different categories of tasks. Each system component 120 may be associated with its own wakeword such that speaking a certain wakeword results in audio data be sent to and processed by a particular system. For example, detection of the wakeword "Alexa" by the wakeword detection component 920 may result in sending audio data to system component 120*a* for processing while detection of the wakeword "Computer" by the wakeword detector may result in sending audio data to system component(s) 120*b* for processing. The system may have a separate wakeword and system for different skills/systems (e.g., "Dungeon Master" for a game play skill/system component 120*c*) and/or such skills/systems may be coordinated by one or more skill(s) 990 of one or more system component(s) 120.

Upon receipt by the system component(s) 120, the audio data 911 may be sent to an orchestrator component 930. The orchestrator component 930 may include memory and logic that enables the orchestrator component 930 to transmit various pieces and forms of data to various components of the system, as well as perform other operations as described herein.

The orchestrator component 930 may send the audio data 911 to a language processing component 992. The language processing component 992 (sometimes also referred to as a spoken language understanding (SLU) component or a speech processing system) includes an automatic speech recognition (ASR) component 950 and a natural language understanding (NLU) component 960. The ASR component 950 may transcribe the audio data 911 into text data. The text data output by the ASR component 950 represents one or more than one (e.g., in the form of an N-best list) ASR hypotheses representing speech represented in the audio data 911. The ASR component 950 interprets the speech in the audio data 911 based on a similarity between the audio data 911 and pre-established language models. For example, the ASR component 950 may compare the audio data 911 with models for sounds (e.g., acoustic units such as phonemes, senons, phones, etc.) and sequences of sounds to identify words that match the sequence of sounds of the speech represented in the audio data 911. The ASR component 950 sends the text data generated thereby to an NLU component 960, via, in some embodiments, the orchestrator component 930. The text data sent from the ASR component 950 to the NLU component 960 may include a single top-scoring ASR hypothesis or may include an N-best list including multiple top-scoring ASR hypotheses. An N-best list may additionally include a respective score associated with each ASR hypothesis represented therein.

The speech processing system 992 may further include a NLU component 960. The NLU component 960 may receive the text data from the ASR component. The NLU component 960 may attempts to make a semantic interpretation of the phrase(s) or statement(s) represented in the text data input therein by determining one or more meanings associated with the phrase(s) or statement(s) represented in the text data. The NLU component 960 may determine an intent representing an action that a user desires be performed and may determine information that allows a device (e.g., the device 110, the system component(s) 120, a skill component 990, a skill system(s) 925, etc.) to execute the intent. For example, if the text data corresponds to "play the 5$^{th}$ Symphony by Beethoven," the NLU component 960 may determine an intent that the system output music and may identify "Beethoven" as an artist/composer and "5th Symphony" as the piece of music to be played. For further example, if the text data corresponds to "what is the weather," the NLU component 960 may determine an intent that the system output weather information associated with a geographic location of the device 110. In another example, if the text data corresponds to "turn off the lights," the NLU component 960 may determine an intent that the system turn off lights associated with the device 110 or the user 5. However, if the NLU component 960 is unable to resolve the entity—for example, because the entity is referred to by anaphora such as "this song" or "my next appointment"— the speech processing system 992 can send a decode request to another speech processing system 992 for information regarding the entity mention and/or other context related to the utterance. The speech processing system 992 may augment, correct, or base results data upon the audio data 911 as well as any data received from the other speech processing system 992.

The NLU component 960 may return NLU results data (which may include tagged text data, indicators of intent, etc.) back to the orchestrator component 930. The orchestrator component 930 may forward the NLU results data to a skill component(s) 990. If the NLU results data includes a single NLU hypothesis, the NLU component 960 and the orchestrator component 930 may direct the NLU results data to the skill component(s) 990 associated with the NLU hypothesis. If the NLU results data includes an N-best list of NLU hypotheses, the NLU component 960 and the orchestrator component 930 may direct the top scoring NLU hypothesis to a skill component(s) 990 associated with the top scoring NLU hypothesis. The system may also include a post-NLU ranker 965 which may incorporate other information to rank potential interpretations determined by the NLU component 960.

A skill component may be software running on the system component(s) 120 that is akin to a software application. That is, a skill component 990 may enable the system component (s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 990. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 990 may operate in conjunction between the system component(s) 120 and other devices, such as the device 110, in order to complete certain functions. Inputs to a skill component 990 may come from speech processing interactions or through other interactions or input sources. A skill component 990 may include hardware, software, firmware, or the like that may be dedicated to a particular skill component 990 or shared among different skill components 990.

A skill support system(s) 925 may communicate with a skill component(s) 990 within the system component(s) 120 and/or directly with the orchestrator component 930 or with other components. A skill support system(s) 925 may be configured to perform one or more actions. An ability to perform such action(s) may sometimes be referred to as a "skill." That is, a skill may enable a skill support system(s) 925 to execute specific functionality in order to provide data or perform some other action requested by a user. For example, a weather service skill may enable a skill support system(s) 925 to provide weather information to the system component(s) 120, a car service skill may enable a skill support system(s) 925 to book a trip with respect to a taxi or ride sharing service, an order pizza skill may enable a skill support system(s) 925 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 990 dedicated to interacting with the skill support system(s) 925. Unless expressly stated otherwise, reference to a skill, skill device, or skill component may include a skill component 990 operated by the system component(s) 120 and/or skill operated by the skill support system(s) 925. Moreover, the functionality described herein as a skill or skill may be referred to using many different terms, such as an action, bot, app, or the like. The skill component 990 and or skill support system(s) 925 may return output data to the orchestrator component 930.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) 120 may include a dialog manager component 972 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 972 may associate a dialog session identifier with the dialog upon identifying that the user is engaging in a dialog with the user. The dialog manager component 972 may track a user input and the corresponding system generated response to the user input as a turn. The dialog session identifier may correspond to multiple turns of user input and corresponding system generated response. The dialog manager component 972 may transmit data identified by the dialog session identifier directly to the orchestrator component 930 or other component. Depending on system configuration the dialog manager component 972 may determine the appropriate system generated response to give to a particular utterance or user input of a turn. Or creation of the system generated response may be managed by another component of the system (e.g., the language output component 993, NLG 979, orchestrator component 930, etc.) while the dialog manager component 972 selects the appropriate responses. Alternatively, another component of the system component(s) 120 may select responses using techniques discussed herein. The text of a system generated response may be sent to a TTS component 280 for creation of audio data corresponding to the response. The audio data may then be sent to a user device (e.g., device 110) for ultimate output to the user. Alternatively (or in addition) a dialog response may be returned in text or some other form.

The dialog manager component 972 may receive the ASR hypothesis/hypotheses (i.e., text data) and make a semantic interpretation of the phrase(s) or statement(s) represented therein. That is, the dialog manager component 972 determines one or more meanings associated with the phrase(s) or statement(s) represented in the text data based on words represented in the text data. The dialog manager component 972 determines a goal corresponding to an action that a user desires be performed as well as pieces of the text data that allow a device (e.g., the device 110, the system component(s) 120, a skill component 990, a skill system(s) 925, etc.) to execute the intent. If, for example, the text data corresponds to "what is the weather," the dialog manager component 972 may determine that that the system component(s) 120 is to output weather information associated with a geographic location of the device 110. In another example, if the text data corresponds to "turn off the lights," the dialog manager component 972 may determine that the system component(s) 120 is to turn off lights associated with the device(s) 110 or the user(s) 5.

The dialog manager component 972 may send the results data to one or more skill(s) 990. If the results data includes a single hypothesis, the orchestrator component 930 may send the results data to the skill(s) 990 associated with the hypothesis. If the results data includes an N-best list of hypotheses, the orchestrator component 930 may send the top scoring hypothesis to a skill(s) 990 associated with the top scoring hypothesis.

The system component(s) 120 includes a language output component 993. The language output component 993 includes a natural language generation (NLG) component 979 and a TTS component 280. The NLG component 979 can generate text for purposes of TTS output to a user. For example the NLG component 979 may generate text corresponding to instructions corresponding to a particular action for the user to perform. The NLG component 979 may generate appropriate text for various outputs as described herein. The NLG component 979 may include one or more trained models configured to output text appropriate for a particular input. The text output by the NLG component 979 may become input for the TTS component 280 (e.g., output text data discussed below). Alternatively or in addition, the TTS component 280 may receive text data from a skill component 990 or other system component for output.

The NLG component 979 may include a trained model. The NLG component 979 generates text data from dialog data received by the dialog manager component 972 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 280.

The TTS component 280 may generate audio data (e.g., synthesized speech) from text data using one or more different methods. Text data input to the TTS component 280 may come from a skill component 990, the orchestrator component 930, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 5 to request capture of image or video data. The device 110 may process the commands locally or send audio data 911 representing the commands to the system component(s) 120 for processing, after which the system component(s) 120 may return output data that can cause the device 110 to engage its camera.

Upon receipt by the system component(s) 120, the image data 921 may be sent to an orchestrator component 930. The orchestrator component 930 may send the image data 921 to an image processing component 940. The image processing component 940 can perform computer vision functions such as object recognition, modeling, reconstruction, etc. For example, the image processing component 940 may detect a person, face, etc. (which may then be identified using user-recognition component 995).

In some implementations, the image processing component 940 can detect the presence of text in an image. In such implementations, the image processing component 940 can recognize the presence of text, convert the image data to text data, and send the resulting text data via the orchestrator component 930 to the language processing component 992 for processing by the NLU component 960.

The system component(s) 120 may include a user-recognition component 995 that recognizes one or more users using a variety of data.

The user-recognition component 995 may take as input the audio data 911 and/or text data output by the ASR component 950. The user-recognition component 995 may perform user recognition by comparing audio characteristics in the audio data 911 to stored audio characteristics of users. The user-recognition component 995 may also perform user recognition by comparing biometric data (e.g., fingerprint data, iris data, etc.), received by the system in correlation with the present user input, to stored biometric data of users assuming user permission and previous authorization. The user-recognition component 995 may further perform user recognition by comparing image data (e.g., including a representation of at least a feature of a user), received by the system in correlation with the present user input, with stored image data including representations of features of different users. The user-recognition component 995 may perform additional user recognition processes, including those known in the art.

The user-recognition component 995 determines scores indicating whether user input originated from a particular user. For example, a first score may indicate a likelihood that the user input originated from a first user, a second score may indicate a likelihood that the user input originated from a second user, etc. The user-recognition component 995 also determines an overall confidence regarding the accuracy of user recognition operations.

Output of the user-recognition component 995 may include a single user identifier corresponding to the most likely user that originated the user input. Alternatively, output of the user-recognition component 995 may include an N-best list of user identifiers with respective scores indicating likelihoods of respective users originating the user input. The output of the user-recognition component 995 may be used to inform NLU processing as well as processing performed by other components of the system.

The system component(s) 120/device 110 may include a presence detection component 994 that determines the presence and/or location of one or more users using a variety of data.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 970 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 975 that may be configured to detect a sentiment of a user from audio data representing speech/utterances from the user, image data representing an image of the user, and/or the like. The sentiment detection component 975 may be included in system component(s) 120, as illustrated in FIG. 9. The system component(s) 120 may use the sentiment detection component 975 to, for example, customize a response for a user based on an indication that the user is happy or frustrated.

Although the components of FIG. 9 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure.

In at least some embodiments, the system component(s) 120 may receive the audio data 911 from the device 110, to recognize speech corresponding to a spoken input in the received audio data 911, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 9, the device 110 may include a wakeword detection component 920 configured to compare the audio data 911 to stored models used to detect a wakeword (e.g., "Alexa") that indicates to the device 110 that the audio data 911 is to be processed for determining NLU output data (e.g., slot data that corresponds to a named entity, label data, and/or intent data, etc.).

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 10 is a block diagram conceptually illustrating a device 110 that may be used with the system. FIG. 11 is a block diagram conceptually illustrating example components of a remote device, such as the system component(s) 120, which may assist with ASR processing, NLU processing, etc., and a skill system 925. A system component(s)/system (120/925) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) 120 may be located remotely from the device 110 as its operations may not require proximity to the user. The server/system component(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component(s) 120 may also be a version of a device 110 that includes different (e.g., more) processing capabilities than other device(s) 110 in a home/office. One benefit to the server/system component(s) 120 being in a user's home/business is that data used to process a command/return a response may be kept within the user's home, thus reducing potential privacy concerns.

Multiple system component(s)/systems (120/925) may be included in the overall system 100 of the present disclosure, such as one or more system component(s) 120 for performing ASR processing, one or more system component(s) 120 for performing NLU processing, one or more skill systems 925, etc. In operation, each of these system component(s)/systems may include computer-readable and computer-executable instructions that reside on the respective device (120/925), as will be discussed further below.

Each of these devices (110/120/925) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/925) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/925) may also be connected to removable or external non-volatile memory and/or storage (such as a removable memory card, memory key drive, networked storage, etc.) through respective input/output device interfaces (1002/1102).

Computer instructions for operating each device (110/120/925) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/925) includes input/output device interfaces (1002/1102). A variety of components may be connected through the input/output device interfaces (1002/1102), as will be discussed further below. Additionally, each device (110/120/925) may include an address/data bus (1024/1124) for conveying data among components of the respective device. Each component within a device (110/120/925) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the system component(s) 120, or a skill system 925 may include their own dedicated processors, memory, and/or storage. Alternatively, one or more of the components of the device(s) 110, the system component(s) 120, or a skill system 925 may utilize the I/O interfaces (1002/1102), processor(s) (1004/1104), memory (1006/1106), and/or storage (1008/1108) of the device(s) 110, system component(s) 120, or the skill system 925, respectively. Thus, the ASR component 950 may have its own I/O interface(s), processor(s), memory, and/or storage; the NLU component 960 may have its own I/O interface (s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and a skill system 925, as described herein, are illustrative, and may be located as a stand-alone device or may be included, in whole or in part, as a component of a larger device or system. As can be appreciated, a number of components may exist either on a system component(s) 120 and/or on device 110. For example, language processing 992 (which may include ASR 950), language output component 993 (which may include NLG 979 and TTS 280), etc., for example as illustrated in FIG. 9. Unless expressly noted otherwise, the system version of such components may operate similarly to the device version of such components and thus the description of one version (e.g., the system version or the local version) applies to the description of the other version (e.g., the local version or system version) and vice-versa.

Figure 12:
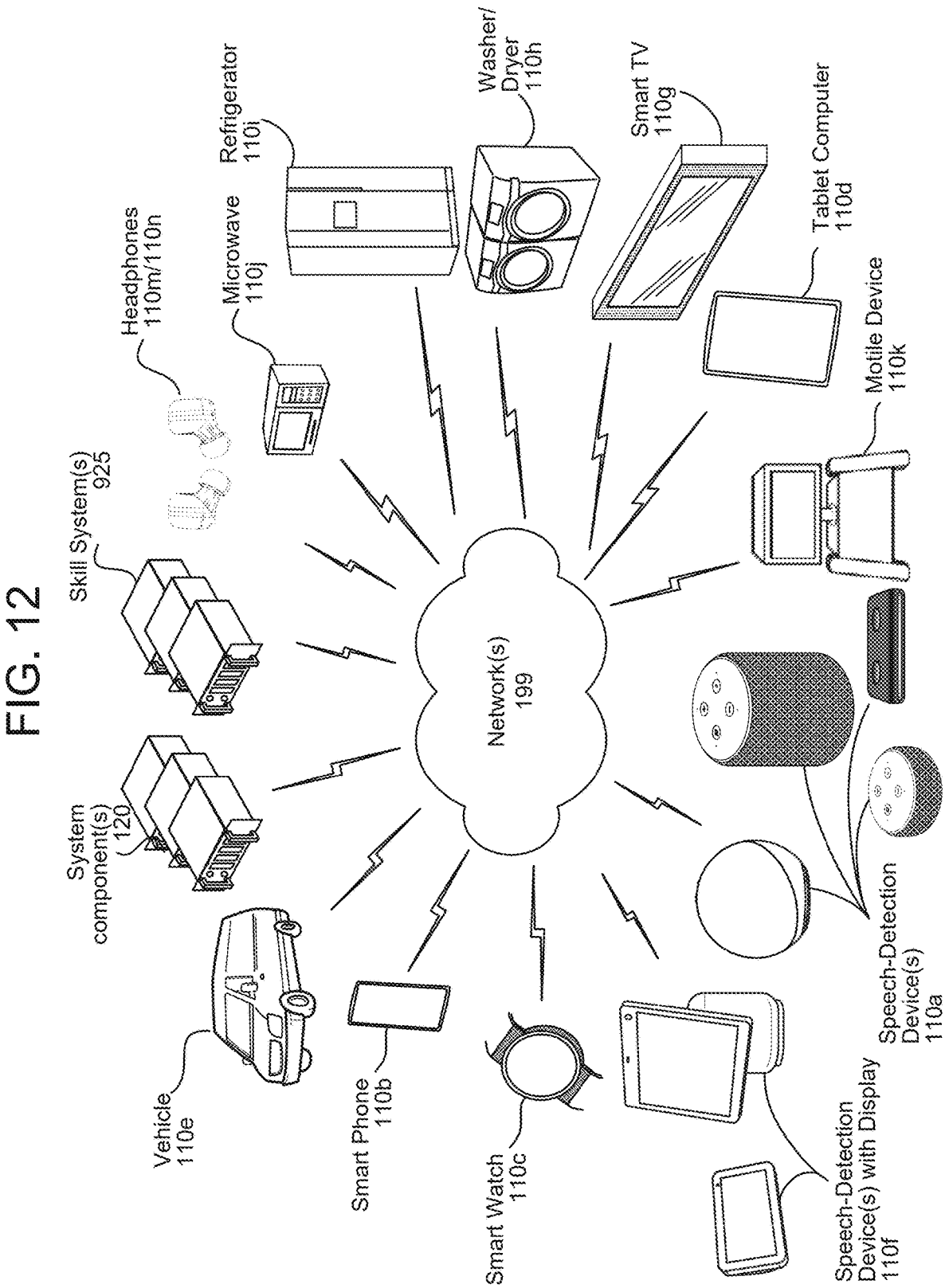
FIG. 12 illustrates an example of a computer network for use with the overall system, according to embodiments of the present disclosure.

As illustrated in FIG. 12, multiple devices (110a-110n, 120, 925) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the system component(s) 120, the skill system(s) 925, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 950, the NLU component 960, etc. of the system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first audio data corresponding to synthesized speech created using a first trained speech synthesis model;

displaying, by a graphical user interface (GUI), first text representing the synthesized speech;

receiving a first user input corresponding to selection of a portion of the first text, the first user input indicating that the portion of the first text includes a first error in the synthesized speech;

receiving a second user input indicating that a category corresponding to the first error in the synthesized speech corresponds to one of:

a missing pause in the synthesized speech, a pause in the synthesized speech with a duration that exceeds a threshold, a pause in the synthesized speech with a duration that does not meet a threshold, and an extra pause in the synthesized speech;

generating, using the first text, the portion of the first text, and the category, first annotated data associated with the first trained speech synthesis model, the first annotated data representing the first error;

based on the first annotated data, determining first data corresponding to a performance of the first trained speech synthesis model;

processing, using a second trained speech synthesis model, the first text to generate second audio data representing second synthesized speech of the first text;

processing the second audio data and the first annotated data to determine, based at least in part on the first error of the first annotated data, second data corresponding to a performance of the second trained speech synthesis model, wherein the second data represents an accuracy of at least a first pause included in the second audio data based on at least the first error; and based at least in part on the second data, determining to process inputs similar to the first text using the second trained speech synthesis model, instead of the first trained speech synthesis model.

2. The computer-implemented method of claim 1, further comprising:

determining, using the first annotated data, a similarity between the first annotated data and at least first stored annotated data, wherein the similarity is determined based at least in part on at least one of:

a semantic interpretation of the first text and second text corresponding to the at least first stored annotated data, and a syntactical structure of the first text and the second text, the syntactical structure corresponding to an arrangement of the first text with respect to the second text; and generating, based at least in part on the similarity, a first test data set including the first annotated data and the at least first stored annotated data.

3. The computer-implemented method of claim 1, further comprising:

determining, using the first annotated data, a similarity between the first annotated data and at least first stored annotated data, wherein the similarity is determined based at least in part on a similarity between the first audio data and at least second output audio data corresponding to first stored annotated data; and generating, based at least in part on the similarity, a first test data set including the first annotated data and the at least first stored annotated data.

4. A computer-implemented method comprising:

receiving, from a first trained speech synthesis model, first audio data corresponding to synthesized speech;

causing output of first content data representing the synthesized speech;

determining, based at least in part on a first user input, a portion of the first content data corresponding to an error in the synthesized speech;

determining, based at least in part on a second user input, a category corresponding to the error;

determining, based at least in part on a third user input, an indication of a severity level corresponding to the error;

generating, using the first content data, the portion of the first content data, the category, and the severity level, first annotated data representing the error;

based on the first annotated data, determining first data corresponding to a performance of the first trained speech synthesis model;

processing, using a second trained speech synthesis model, the first content data to generate second audio data corresponding to the first content data;

processing the second audio data and the first annotated data to determine, based at least in part on the error of the first annotated data, second data corresponding to a performance of the second trained speech synthesis model, wherein the second data represents an accuracy of at least a first pause included in the second audio data based on at least the error of the first annotated data; and based at least in part on the second data, determining to process input data similar to the first content data using the second trained speech synthesis model, instead of the first trained speech synthesis model.

5. The computer-implemented method of claim 4, further comprising:

determining, using the first annotated data, a similarity between the first annotated data and second annotated data, wherein the similarity is determined based at least in part on at least one of:

a content type of the first content data and second content data corresponding to the second annotated data, and a syntactical structure of the first content data and the second content data;

generating, based at least in part on the similarity, a first test data set including the first annotated data and the second annotated data; and sending the first test data set to the first trained speech synthesis model.

6. The computer-implemented method of claim 5, further comprising:

prior to determining the similarity between the first annotated data and the second annotated data, determining the first annotated data corresponds to a category of content; and determining, based at least in part on the first annotated data, that the first test data set corresponds to the category of content, wherein generating the first test data set is based at least in part on determining that the first annotated data corresponds to the category of content.

7. The computer-implemented method of claim 4, further comprising:

displaying, by a graphical user interface (GUI):

a first GUI element configured to output audio corresponding to the first audio data in response to a user input, the first content data, a second GUI element representing the category, and a third GUI element representing the severity level, wherein:

the first user input corresponds to the first content data, the second user input corresponds to the second GUI element, and the third user input corresponds to the third GUI element.

8. The computer-implemented method of claim 4, further comprising:

sending the first content data to the first trained speech synthesis model;

receiving, from the first trained speech synthesis model, third audio data corresponding to the first content data;

processing the third audio data to determine, based at least in part on the first annotated data, a score corresponding to the first trained speech synthesis model; and based at least in part on the score and the first annotated data, configuring the first trained speech synthesis model.

9. The computer-implemented method of claim 4, further comprising:

prior to processing the first content data using the second trained speech synthesis model, determining to output synthesized speech corresponding to a category of content;

based at least in part on determining to output synthesized speech corresponding to the category of content, determining a first test data set corresponding to the category of content, the first test data set including the first annotated data;

determining, from the first test data set, the first content data of the first annotated data, and processing, using the second trained speech synthesis model, the first content data to generate the second audio data.

10. The computer-implemented method of claim 4, wherein the first user input, the second user input, and the third user input are associated with a first user, and the method further comprises:

determining, based at least in part on a fourth user input associated with a second user, a second portion of the first content data corresponding to a second error in the synthesized speech;

determining, based at least in part on a fifth user input associated with the second user, a second category corresponding to the second error;

determining, based at least in part on a sixth user input associated with the second user, an indication of a second severity level corresponding to the second error;

generating, using the first content data, the second portion of the first content data, the second category, and the second severity level, second annotated data;

determining a similarity between the first annotated data and the second annotated data; and determining, based at least in part on the similarity, a score corresponding to the first annotated data and the second annotated data.

11. A computing system comprising:

at least one processor; and at least one memory comprising instructions that, when executed by the at least one processor, cause the computing system to:

receive, from a first trained speech synthesis model, first audio data corresponding to synthesized speech;

cause output of first content data representing the synthesized speech;

determine, based at least in part on a first user input, a portion of the first content data corresponding to an error in the synthesized speech;

determine, based at least in part on a second user input, a category corresponding to the error;

determine, based at least in part on a third user input, an indication of a severity level corresponding to the error;

generate, using the first content data, the portion of the first content data, the category, and the severity level, first annotated data representing error;

based on the first annotated data, determine first data corresponding to a performance of the first trained speech synthesis model;

process, using a second trained speech synthesis model, the first content data to generate second audio data corresponding to the first content data;

process the second audio data and the first annotated data to determine, based at least in part on the error of the first annotated data, second data corresponding to a performance of the second trained speech synthesis model, wherein the second data represents an accuracy of at least a first pause included in the second audio data based on at least the error of the first annotated data; and based at least in part on the second data, determine to process input data similar to the first content data using the second trained speech synthesis model, instead of the first trained speech synthesis model.

12. The computing system of claim 11, wherein the at least one memory further comprises instructions that, when executed by the at least one processor, further cause the computing system to:

determine, using the first annotated data, a similarity between the first annotated data and second annotated data, wherein the similarity is determined based at least in part on at least one of:

a content type of the first content data and second content data corresponding to the second annotated data, and a syntactical structure of the first content data and the second content data;

generate, based at least in part on the similarity, a first test data set including the first annotated data and the second annotated data; and send the first test data set to the first trained speech synthesis model.

13. The computing system of claim 12, wherein the at least one memory further comprises instructions that, when executed by the at least one processor, further cause the computing system to:

prior to determining the similarity between the first annotated data and the second annotated data, determine the first annotated data corresponds to a category of content; and determine, based at least in part on the first annotated data, that the first test data set corresponds to the category of content, wherein generating the first test data set is based at least in part on determining that the first annotated data corresponds to the category of content.

14. The computing system of claim 12, wherein the at least one memory further comprises instructions that, when executed by the at least one processor, further cause the computing system to:

display, by a graphical user interface (GUI):

a first GUI element configured to output audio corresponding to the first audio data in response to a user input, the first content data, a second GUI element representing the category, and a third GUI element representing the severity level, wherein:

the first user input corresponds to the first content data, the second user input corresponds to the second GUI element, and the third user input corresponds to the third GUI element.

15. The computing system of claim 11, wherein the at least one memory further comprises instructions that, when executed by the at least one processor, further cause the computing system to:

send the first content data to the first trained speech synthesis model;

receive, from the first trained speech synthesis model, third audio data corresponding to the first content data;

process the third audio data to determine, based at least in part on the first annotated data, a score corresponding to the first trained speech synthesis model; and based at least in part on the score and the first annotated data, configure the first trained speech synthesis model.

16. The computing system of claim 11, wherein the at least one memory further comprises instructions that, when executed by the at least one processor, further cause the computing system to:

prior to processing the first content data using the second trained speech synthesis model, determine to output synthesized speech corresponding to a category of content;

based at least in part on the determination to output synthesized speech corresponding to the category of content, determine a first test data set corresponding to the category of content, the first test data set including the first annotated data;

determine, from the first test data set, the first content data of the first annotated data; and process, using the second trained speech synthesis model, the first content data to generate the second audio data.

17. The computing system of claim 11, wherein the first user input, the second user input, and the third user input are associated with a first user, and the at least one memory further comprises instructions that, when executed by the at least one processor, further cause the computing system to:

determine, based at least in part on a fourth user input associated with a second user, a second portion of the first content data corresponding to a second error in the synthesized speech;

determine, based at least in part on a fifth user input associated with the second user, a second category corresponding to the second error;

determine, based at least in part on a sixth user input associated with the second user, an indication of a second severity level corresponding to the second error;

generate, using the first content data, the second portion of the first content data, the second category, and the second severity level, second annotated data; and determine a similarity between the first annotated data and the second annotated data; and determine, based at least in part on the similarity, a score corresponding to the first annotated data and the second annotated data.

* * * * *